United States Patent
Yanagihara et al.

(10) Patent No.: US 11,421,752 B2
(45) Date of Patent: Aug. 23, 2022

(54) TRANSMISSION V-BELT

(71) Applicant: Mitsuboshi Belting Ltd., Kobe (JP)

(72) Inventors: Kazuhito Yanagihara, Hyogo (JP);
Tsuyoshi Nashiro, Hyogo (JP);
Susumu Takaba, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 728 days.

(21) Appl. No.: 16/319,127

(22) PCT Filed: Jul. 20, 2017

(86) PCT No.: PCT/JP2017/026197
§ 371 (c)(1),
(2) Date: Jan. 18, 2019

(87) PCT Pub. No.: WO2018/016557
PCT Pub. Date: Jan. 25, 2018

(65) Prior Publication Data
US 2021/0003195 A1    Jan. 7, 2021

(30) Foreign Application Priority Data

Jul. 22, 2016 (JP) .............................. JP2016-144298
Jul. 13, 2017 (JP) .............................. JP2017-136697

(51) Int. Cl.
*F16G 5/08*     (2006.01)
*C08L 11/00*    (2006.01)
(Continued)

(52) U.S. Cl.
CPC ................ *F16G 5/08* (2013.01); *B32B 7/022* (2019.01); *B32B 25/042* (2013.01); *B32B 25/14* (2013.01);
(Continued)

(58) Field of Classification Search
CPC ...... F16G 5/08; F16G 5/20; F16G 5/22; C09J 7/35; C09J 2411/00; C09J 2411/008;
(Continued)

(56) References Cited

U.S. PATENT DOCUMENTS 4,869,711 A * 9/1989 Komai .................. F16G 5/06
474/263
2006/0105873 A1  5/2006 Sato et al.
(Continued)

FOREIGN PATENT DOCUMENTS

CN    1065711 A    10/1992
EP    2980445 A1   2/2016
(Continued)

OTHER PUBLICATIONS

Aug. 6, 2019—(JP) Notification of Reasons for Refusal—App 2017-136697.
(Continued)

*Primary Examiner* — Frank J Vineis
*Assistant Examiner* — Donald M Flores, Jr.
(74) *Attorney, Agent, or Firm* — Banner & Witcoff, Ltd.

(57) ABSTRACT

A power transmission V-belt includes a tension member, an adhesion rubber layer in which at least part of the tension member is embedded, and a tension rubber layer and a compression rubber layer stacked via the adhesion rubber layer. A rubber hardness of the tension rubber layer is smaller than a rubber hardness of the compression rubber layer. In the adhesion rubber layer, a rubber hardness on a tension rubber layer side relative to the tension member is smaller than a rubber hardness on a compression rubber layer side.

13 Claims, 5 Drawing Sheets

(51) Int. Cl.
*C08J 5/12* (2006.01)
*C09J 7/35* (2018.01)
*B32B 7/022* (2019.01)
*B32B 25/14* (2006.01)
*B32B 25/04* (2006.01)
*F16G 5/20* (2006.01)
*F16G 5/22* (2006.01)

(52) U.S. Cl.
CPC ............... *C08J 5/128* (2013.01); *C08L 11/00* (2013.01); *C09J 7/35* (2018.01); *F16G 5/20* (2013.01); *F16G 5/22* (2013.01); *B32B 2307/536* (2013.01); *B32B 2413/00* (2013.01); *B32B 2433/04* (2013.01); *C08J 2311/00* (2013.01); *C08J 2411/00* (2013.01); *C09J 2411/00* (2013.01); *C09J 2411/008* (2013.01); *Y10T 428/24983* (2015.01)

(58) Field of Classification Search
CPC ....... B32B 7/022; B32B 25/042; B32B 25/14; B32B 2433/04; B32B 2307/536; B32B 2413/00; C08J 5/128; C08J 2311/00; C08J 2411/00; C08L 11/00; Y10T 428/24983; C08K 2003/2217; C08K 2003/2296; C08K 3/22; C08K 3/36; C08K 5/3415; C08K 3/04
See application file for complete search history.

(56) References Cited

U.S. PATENT DOCUMENTS

2009/0186733 A1    7/2009    Fujiwara et al.

| 2015/0111677 | A1* | 4/2015 | Nishiyama | F16G 5/20 |
| | | | | 474/264 |

FOREIGN PATENT DOCUMENTS

| JP | S61-290255 | A | 12/1986 |
| JP | 05-054851 | U | 7/1993 |
| JP | H10-238596 | A | 9/1998 |
| JP | 2004211755 | A | 7/2004 |
| JP | 2006-038214 | A | 2/2006 |
| JP | 2009-150538 | A | 7/2009 |
| JP | 2010-248401 | A | 11/2010 |
| TW | 200407511 | A | 5/2004 |
| TW | 201622656 | A | 7/2016 |

OTHER PUBLICATIONS

Jun. 21, 2021—(EP) Office Action—App 17831073.6.
Feb. 21, 2020—(CN) Notification of First Office Action—App 201780044876.8.
Feb. 20, 2020—(EP) Extended Search Report—App 17831073.6.
Apr. 8, 2020—Substantive Examination Report—App P00201900463.
Feb. 8, 2018—(TW) Office Action—App 106124642—Eng Tran.
Sep. 12, 2017—International Search Report—Intl App PCT/JP2017/026197.
May 7, 2019—(JP) Notification of Reasons for Refusal—App 2017-136697.
Dec. 28, 2021—(VN) Office Action—App 1-2019-00345, Eng Tran.
Jan. 22, 2019—(WO) International Preliminary Report on Patentability—App PCT/JP2017/026197, Eng Tran.

* cited by examiner

TRANSMISSION V-BELT

CROSS REFERENCE TO RELATED APPLICATIONS:

This is a U.S. National Phase Application under 35 U.S.C. § 371 of International Application No. PCT/JP2017/026197, filed Jul. 20, 2017, which claims priority to Japanese Application Nos. 2016-144298, filed Jul. 22, 2016 and 2017-136697, filed Jul. 13, 2017, which was published Under PCT Article 21(2), the entire contents of which are incorporated herein by reference.

TECHNICAL FIELD

The present invention relates to a power transmission V-belt useful for transmitting power by frictional power transmission.

BACKGROUND ART

The V-belt for transmitting power by frictional power transmission includes a Raw-Edge type (raw-edge V-belt) in which the frictional power transmission surface is an exposed rubber layer, and a Wrapped type (wrapped V-belt) in which the frictional power transmission surface (V-shaped side surface) is covered with cover fabric, and these are used differently according to use due to a difference in the surface property (a coefficient of friction between the rubber layer and the cover fabric) of the frictional power transmission surface. In addition, the belt of raw-edge type includes a raw-edge cogged V-belt in which cogs are provided on only a bottom surface (inner circumferential surface) of the belt or on both the bottom surface (inner circumferential surface) and the top surface (outer circumferential surface) of the belt so as to improve bendability.

The raw-edge V-belt or raw-edge cogged V-belt is mainly used, for example, for driving a general industrial machine or agricultural machine or for driving accessories in a vehicle engine. As other uses, there is a raw-edge cogged V-belt called a variable speed belt, which is used for a belt-type continuously variable transmission device of a motorcycle, etc.

The belt-type continuously variable transmission device 30 is, as illustrated in FIG. 1, a device for steplessly changing the gear ratio by winding a power transmission V-belt 10 across a drive pulley 31 and a driven pulley 32. The pulleys 31 and 32 respectively have fixed pulley pieces 31a and 32a which are restrained or fixed from movement in the axial direction, and movable pulley pieces 31b and 32b which are movable in the axial direction, and inner circumferential walls of fixed pulley pieces 31a and 32a and inner circumferential walls of movable pulley pieces 31b and 32b form inclined opposing surfaces of a V-shaped groove. Each pulley 31 or 32 has a structure where the width of V-shaped groove of pulleys 31 and 32 formed by those fixed pulley pieces 31a and 32a and movable pulley pieces 31b and 32b can be continuously changed. Both end faces in the width direction of the power transmission V-belt 10 are formed as a tapered surface having an inclination corresponding to the inclined opposing surfaces of V-shaped groove of each pulley 31 or 32 and are engaged with arbitrary positions in the vertical direction on the opposing surfaces of V-shaped groove according to the changed width of V-shaped groove. For example, when the state illustrated in a part (a) of FIG. 1 is changed to the state illustrated in a part (b) of FIG. 1 by decreasing the width of V-shaped groove of the drive pulley 31 and increasing the width of V-shaped groove of the driven pulley 32, the power transmission V-belt 10 moves upward in V-shaped groove on the drive pulley side 31 and moves downward in V-shaped groove on the driven pulley 32 side, and the radius of winding of the belt across respective pulleys 31 and 32 is continuously changed, making it possible to steplessly change the gear ratio. The variable speed belt employed for such an application is largely bent and at the same time, the belt is used in a severe layout under high load. More specifically, a specific design is laid out so as to endure not only winding and rotation running between two shafts of a drive pulley and a driven pulley but also severe movement in a high-load environment, such as movement in the pulley radial direction and repeated bending action due to a continuous change in the winding radius.

In recent years, such a V-belt, particularly, a variable speed belt used for a belt-type continuously variable transmission device, is required to satisfy both lateral pressure resistance and fuel consumption saving at high level, which is, however, a big challenge, because lateral pressure resistance and fuel consumption saving are in a trade-off relationship. Accordingly, various technologies have been proposed in terms of belt shape, compounding design, etc.

In a V-belt such as variable speed belt, one of important factors responsible for balancing durability and fuel consumption saving is the resistance to lateral pressure from a pulley.

With respect to durability, among others, in a V-belt used in a severe layout under particularly high load, the lateral pressure resistance has a great effect, because the thrust generated between both belt side surfaces and the pulley V-groove in the process of rotating and running between two shafts of a drive pulley and a driven pulley is very large and the belt side surface receives a large lateral pressure from the pulley. More specifically, buckling deformation (dishing) is produced due to the lateral pressure and when extreme dishing is produced, not only the transmission performance deteriorates but also interlayer (for example, between a compression rubber layer and an adhesion rubber layer) separation (or cracking) is likely to occur, causing reduction in the durability.

On the other hand, with respect to the fuel consumption saving (transmission efficiency), increasing rigidity in the belt width direction (lateral pressure resistance) leads to an increase in the transmission efficiency (decrease in the transmission loss) and therefore, the lateral pressure resistance is an important factor as well. In addition, reducing the rigidity in the belt circumferential direction (increasing the bendability) also leads to an increase in the transmission efficiency (decrease in the bending loss) and therefore, it is also an important factor to ensure bendability to an extent capable of maintaining lateral pressure resistance.

Against the background of studying "balancing of durability and fuel consumption saving", "decreasing the thickness (compactification) of the belt" is also required with the purpose of reducing the cost or further enhancing the transmission efficiency. However, when the belt thickness is decreased, this brings about (a) a problem that the lateral pressure resistance is reduced, namely, deformation (dishing) occurs due to lateral pressure, and a stress is concentrated on the interface having a difference in the dynamic properties to cause interfacial separation (cracking) between layers, and furthermore, (b) a problem that the belt is readily affected by the vibration during belt running (shifting operation such as acceleration and deceleration) and occurrence of interfacial separation (cracking) is promoted by the vibration. That is, a new challenge is to achieve "balancing of durability and fuel consumption saving" on the condition of "reducing the belt thickness (compactification)".

Conventionally, a rubber composition reinforced by compounding with a short fiber, etc. to increase the dynamic properties has been used for the compression rubber layer or tension rubber layer so as to ensure lateral pressure resistance. For example, JP-A-10-238596 (Patent Document 1) describes a power transmission V-belt including an adhesion rubber layer having embedded therein a cord, a tension rubber layer and a compression rubber layer, stacked via the adhesion rubber layer, and a canvas layer stacked on at least either one of the tension rubber layer and the compression rubber layer, wherein each rubber layer is exposed to both side surfaces and the bottom surface forms a cogged profile and wherein the rubber hardness of at least either one of the tension and compression rubber layers is set to 90 to 96°, the rubber hardness of the adhesion rubber layer is set to 83 to 89°, and an aramid short fiber are oriented in the belt width direction in the tension and compression rubber layers, thereby enhancing the lateral pressure resistance. In this patent document, the tension and compression rubber layers are formed of a short fiber-containing rubber containing 100 parts by weight of a chloroprene rubber, from 40 to 60 parts by weight of a reinforcing filler, from 1 to 20 parts by weight of a metal oxide vulcanizing agent, from 2 to 10 parts by weight of a bismaleimide, and the above-described aramid short fiber and the adhesion rubber layer is formed of a rubber containing 100 parts by weight of a chloroprene rubber, from 30 to 50 parts by weight of a reinforcing filler, from 1 to 20 parts by weight of a metal oxide vulcanizing agent, from 5 to 30 parts by weight of a silica, and from 2 to 10 parts by weight of a bismaleimide.

In addition, JP-A-2009-150538 (Patent Document 2) discloses a cogged V-belt in which the rubber hardness of the tension rubber layer is from 85 to 92, the rubber hardness of the compression rubber layer is from 90 to 98, and the rubber hardness of the compression rubber layer is set to be higher by 3 to 10 than the rubber hardness of the tension rubber layer. In this cogged V-belt, dishing is suppressed despite high-load transmission, separation between upper and lower parts of the belt or jumping out of the tension member does not occur in the tension member-embedded portion, and furthermore, bendability is imparted to the belt.

However, in order to ensure lateral pressure resistance with a small-thickness belt, higher hardness than that of a conventional-thickness belt is required, and moreover, reduction in the thickness involves the following problems.

(c) When the hardness of both the tension rubber layer and the compression rubber layer, particularly, of the tension rubber layer, is set to be high as in the method of prior document 1, the bendability is deteriorated and in turn, cracking (cracks) is likely to occur in the tension rubber layer. Furthermore, since the difference in dynamic properties between the tension rubber/compression rubber layers and the adhesion rubber layer is large, separation at the interface thereof readily occurs.

(d) In the method of prior document 2, even when the hardness of the compression rubber layer is set to be high, since the hardness of the tension rubber is low, elastic deformation can be achieved without resisting the lateral pressure from a pulley and bendability can be ensured. However, the adhesion rubber layer is not taken into consideration, and due to the effect of the above-described belt buckling deformation or vibration during belt running (shifting operation such as acceleration and deceleration), separation at the interface between the tension member and the adhesion rubber layer (separation of only the upper side with the tension member as a border) is likely to occur.

JP-A-61-290255 (Patent Document 3) discloses, as a material of the adhesion rubber layer of a rubber V-belt, a rubber composition containing from 1 to 20 parts by mass of a metal oxide vulcanizing agent, from 5 to 30 parts by mass of a silica, from 15 to 50 parts by mass of a reinforcing filler, and from 2 to 10 parts by mass of a bismaleimide, per 100 parts by mass of a chloroprene rubber. In Examples of this document, an adhesion rubber composition containing 35 parts by mass of a carbon black, 25 parts by mass of silica, and from 2 to 8 parts by mass of a bismaleimide, per 100 parts by mass of a chloroprene rubber is prepared, and by compounding bismaleimide in the adhesion rubber layer, the elastic modulus rises due to the effect of increasing the crosslinking density and not only the compression set is small but also the fatigue resistance is excellent.

However, even this adhesion rubber layer cannot sufficiently withstand use in such a severe high-load environment as experienced by a variable speed belt, and when the hardness is made excessively high by increasing the compounding amount of bismaleimide, the bending fatigue resistance decreases.

CITATION LIST

Patent Document

Patent Document 1: JP-A-10-238596
Patent Document 2: JP-A-2009-150538
Patent Document 3: JP-A-61-290255

SUMMARY OF INVENTION

Technical Problem

Accordingly, an object of the present invention is to provide a power transmission V-belt capable of achieving both durability and fuel consumption saving at the time of running in a high-load environment.

Another object of the present invention is to provide a power transmission V-belt ensuring that even when the belt is reduced in thickness (made compact) and used in the form susceptible to effect of buckling deformation or vibration, interlayer separation of a tension rubber layer and a compression rubber layer or separation of a tension member (cord), relative to an adhesion rubber layer, and cracking (cracks) of the tension rubber layer can be suppressed.

Still another object of the present invention is to provide a power transmission V-belt ensuring that even under severe conditions in a high-load environment experienced by a variable speed belt, etc., cracking of a tension rubber layer and interfacial separation between a tension member and an adhesion rubber layer can be effectively suppressed over a long period of time.

Solution to Problem

As a result of intensive studies so as to attain the objects above, the present inventors have found that not only the relationship in terms of rubber hardness between a compression rubber layer and a tension rubber layer but also the relationship in terms of rubber hardness among an adhesion rubber layer, a compression rubber layer and a tension rubber layer greatly affect the durability and in particular, when the belt thickness is reduced, distribution of the rubber hardness of the adhesion rubber layer greatly affects interlayer separation of the compression rubber layer and the tension rubber layer and separation from the tension member (cord). The present invention has been accomplished based on this finding.

More specifically, the power transmission V-belt (transmission V-belt) of the present invention includes a tension member, an adhesion rubber layer in which at least part of the tension member is embedded, and a tension rubber layer and a compression rubber layer stacked via the adhesion rubber layer.

The rubber hardness of the tension rubber layer is formed to be smaller than the rubber hardness of the compression rubber layer, and in the adhesion rubber layer, the rubber hardness on the tension rubber layer side relative to the tension member is formed to be smaller than the rubber hardness on the compression rubber layer side. The hardness of the adhesion rubber layer may be adjusted stepwise or continuously. In addition to setting the hardness of the tension rubber layer to be low compared with the compression rubber layer, in the adhesion rubber layer, the hardness on the tension rubber layer side (upper layer side) is set to be low compared with the compression rubber layer side (lower layer side), so that cracking (cracks) of the tension rubber layer can be suppressed and at the same time, separation at the interface between the tension member (or cord) and the adhesion rubber layer (a phenomenon where only the upper side (tension rubber layer side) peels with the tension member or cord as a border) can also be suppressed. Furthermore, the hardness of the rubber on the lower side or inner circumferential side (lower side layer of the adhesion rubber layer, compression rubber layer side) relative to the tension member (or cord) is set to be higher than that of the rubber on the upper side or outer circumferential side (upper side layer of the adhesion rubber layer, the tension rubber layer side) relative to the tension member (or cord), and lateral pressure resistance can thereby be ensured. Consequently, even during running under severe conditions in a high-load environment experienced by a variable speed belt, etc., both durability and fuel consumption saving can be achieved, and interlayer separation of the tension rubber layer and the compression rubber layer or separation of the tension member (cord), relative to the adhesion rubber layer, and cracking (cracks) of the tension rubber layer can be suppressed. In particular, even when the belt is reduced in thickness (made compact), cracking of the tension rubber layer and interfacial separation between the tension member and the adhesion rubber layer can be effectively suppressed over a long period of time.

In such a power transmission V-belt, despite reduction in the thickness, both durability and fuel consumption saving can be achieved during running under severe conditions in a high-load environment. Accordingly, the thickness of the power transmission V-belt may be, for example, approximately from 6.5 to 8.5 mm The rubber hardness of the adhesion rubber layer is, for example, approximately from 74 to 85°, and in the adhesion rubber layer, the difference in rubber hardness between the tension rubber layer side and the compression rubber layer side relative to the tension member may be approximately from 2 to 12°. For example, the adhesion rubber layer may be formed of a plurality of rubber layers, the rubber hardness of a first adhesion rubber layer put into contact with the tension rubber layer may be approximately from 74 to 82°, the rubber hardness of a second adhesion rubber layer put into contact with the compression rubber layer may be approximately from 77 to 85°, and the difference in rubber hardness between the first adhesion rubber layer and the second adhesion rubber layer may be approximately from 2 to 10°.

The rubber hardness of the tension rubber layer may be approximately from 83 to 89°, the rubber hardness of the compression rubber layer may be approximately from 89 to 95°, and the difference in rubber hardness between both rubber layers may be approximately from 3 to 10°.

Each of the tension rubber layer and the compression rubber layer having such a rubber hardness relationship may be formed of a rubber composition containing from 25 to 60 parts by mass of a carbon black, from 15 to 30 parts by mass of a short fiber, from 1 to 20 parts by mass of a vulcanizing agent (e.g., metal oxide vulcanizing agent), and from 2 to 5 parts by mass of a bismaleimide, per 100 parts by mass of a rubber component (e.g., chloroprene rubber), and the rubber hardness may be adjusted by containing at least one component selected from the carbon black, the bismaleimide and the short fiber in a larger proportion in the compression rubber layer than in the tension rubber layer.

The adhesion rubber layer may be formed of a rubber composition containing from 25 to 50 parts by mass of a carbon black, from 10 to 30 parts by mass of a silica, from 1 to 20 parts by mass of a vulcanizing agent (e.g., metal oxide vulcanizing agent), and from 0.5 to 5 parts by mass of a bismaleimide, per 100 parts by mass of a rubber component (e.g., chloroprene rubber), and the rubber hardness may be adjusted by containing at least one component selected from the carbon black, the silica and the bismaleimide in a smaller proportion in the tension rubber layer side than in the compression rubber layer side.

The power transmission V-belt may further have a cog at least on the inner circumferential surface side. Furthermore, a reinforcing fabric layer may be stacked on at least one rubber layer (particularly, both rubber layers) of the tension rubber layer (the top surface of the tension rubber surface) and the compression rubber layer (the bottom surface of the compression rubber layer or, in the case where the cog is formed on the inner circumferential surface of the compression rubber layer, the bottom surface of the cog), and both side surfaces of each rubber layer may be exposed.

Such a power transmission V-belt is useful as a variable speed belt, etc.

In the present description, the rubber hardness of each rubber layer indicates the value Hs (JIS A) measured in conformity with Spring Hardness Test (type A) specified in JIS K6301 (vulcanized rubber physical test method) and is sometimes simply referred to as rubber hardness. Furthermore, in some cases, the rubber hardness of the adhesion rubber layer is denoted by H1, the rubber hardness of the tension rubber layer is denoted by H2, the rubber hardness of the compression rubber layer is denoted by H3, the rubber hardness on the tension rubber layer side of the adhesion rubber layer is denoted by $H1_2$, and the rubber hardness on the compression rubber layer side of the adhesion rubber layer is denoted by $H1_3$.

ADVANTAGEOUS EFFECTS OF INVENTION

In the present invention, the rubber hardness is set to be larger in the compression rubber layer than in the tension rubber layer and at the same time, in the adhesion rubber layer, the rubber hardness is set to be larger on the compression rubber layer side than on the tension rubber layer side, so that balancing of durability and fuel consumption saving can be achieved even at the time of running in a high-load environment. In particular, even when the belt is reduced in thickness (made compact) and used in the form susceptible to effect of buckling deformation or vibration, interlayer separation of the tension rubber layer and the compression rubber layer or separation of the tension member (cord), relative to the adhesion rubber layer, and cracking (cracks) of the tension rubber layer can be suppressed. Furthermore, even under severe conditions in a high-load environment experienced by a variable speed belt, etc., cracking of the tension rubber layer and interfacial separation between the tension member and the adhesion rubber layer can be effectively suppressed over a long period of time.

MODE FOR CARRYING OUT THE INVENTION

[Structure of Power Transmission V-Belt]

The power transmission V-belt (transmission V-belt) of the present invention includes a tension member, an adhesion rubber layer in which at least part of the tension member is embedded in the longitudinal direction of the belt, a compression rubber layer formed on one surface of the adhesion rubber layer, and a tension rubber layer formed on another surface of the adhesion rubber layer.

Examples of the power transmission V-belt of the present invention include a V-belt [a wrapped V-belt, a raw-edge V-belt, a raw-edge cogged V-belt (a raw-edge cogged V-belt in which cogs are formed on the inner circumferential side of a raw-edge V-belt, a raw-edge double-cogged V-belt in which cogs are formed on both the inner circumferential side and the outer circumferential side of a raw-edge V-belt)], and a V-ribbed belt. Among these V-belts, in view of large lateral pressure from the pulley, a V-belt or V-ribbed belt in which power transmission surfaces are formed to be inclined in V-shape (or at V angle) is preferred, and a V-belt required to achieve both lateral pressure resistance and fuel consumption saving at high level, for example, a V-belt used for a belt-type continuously variable transmission device (e.g., raw-edge cogged V-belt), is particularly preferred.

Figure 1:
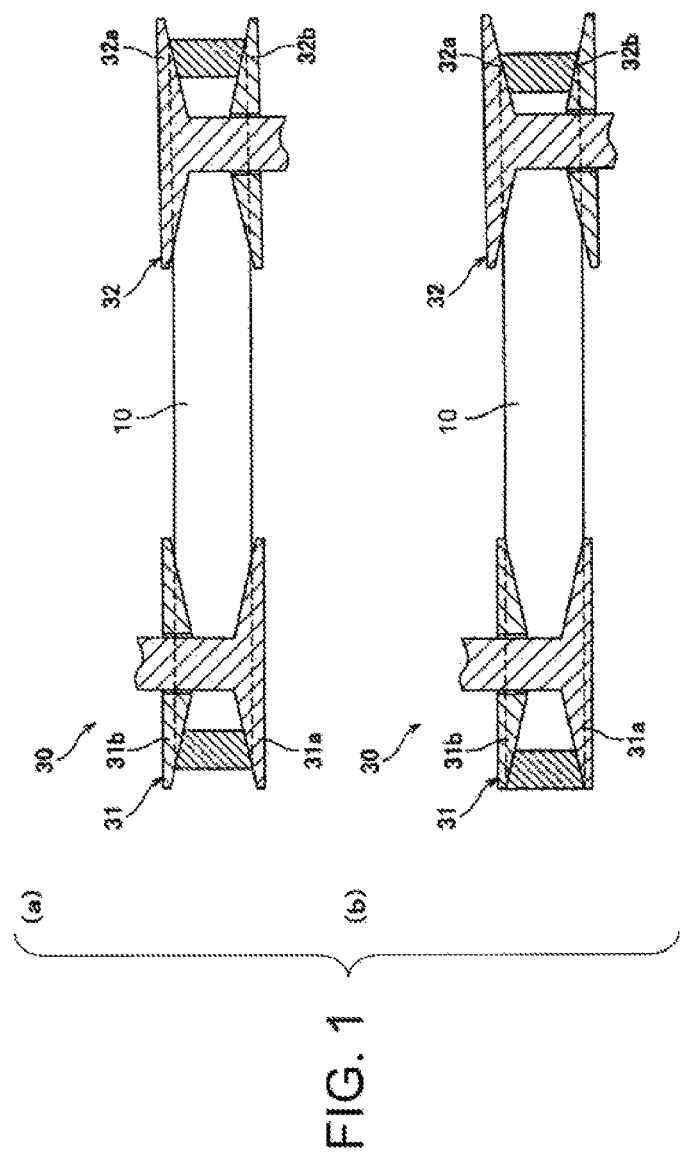
FIG. 1 is a schematic diagram for explaining the speed change mechanism of the belt-type continuously variable transmission device.
Figure 2:
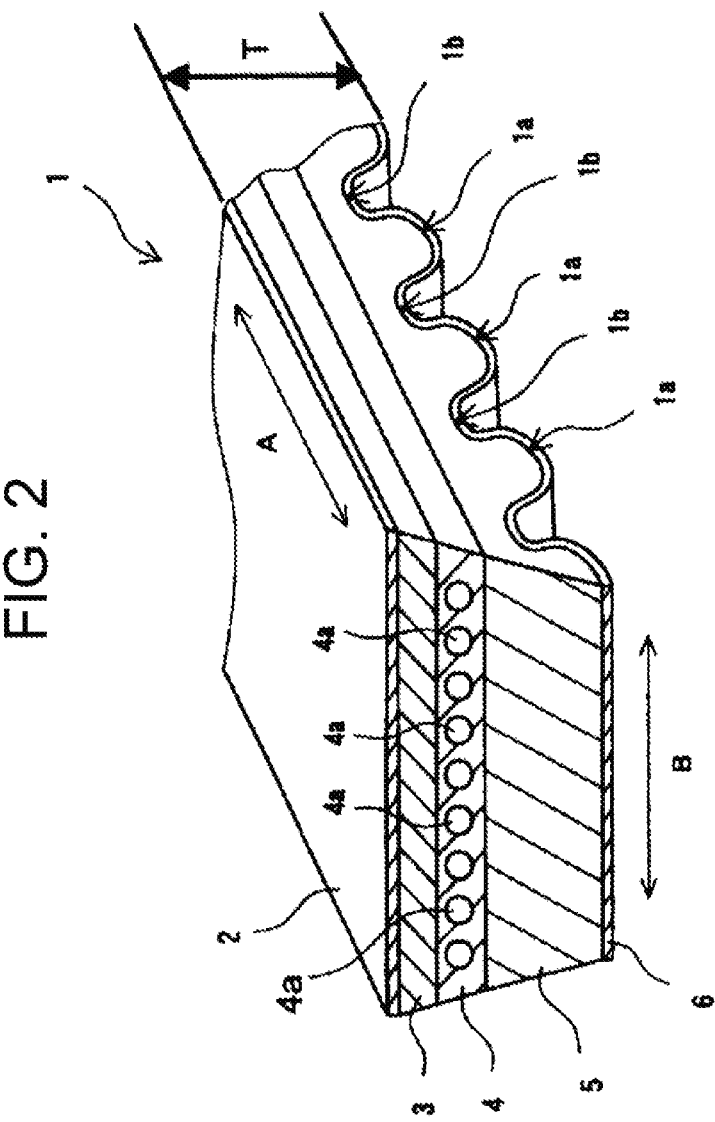
FIG. 2 is a schematic perspective diagram illustrating one example of the power transmission V-belt of the present invention.
Figure 3:
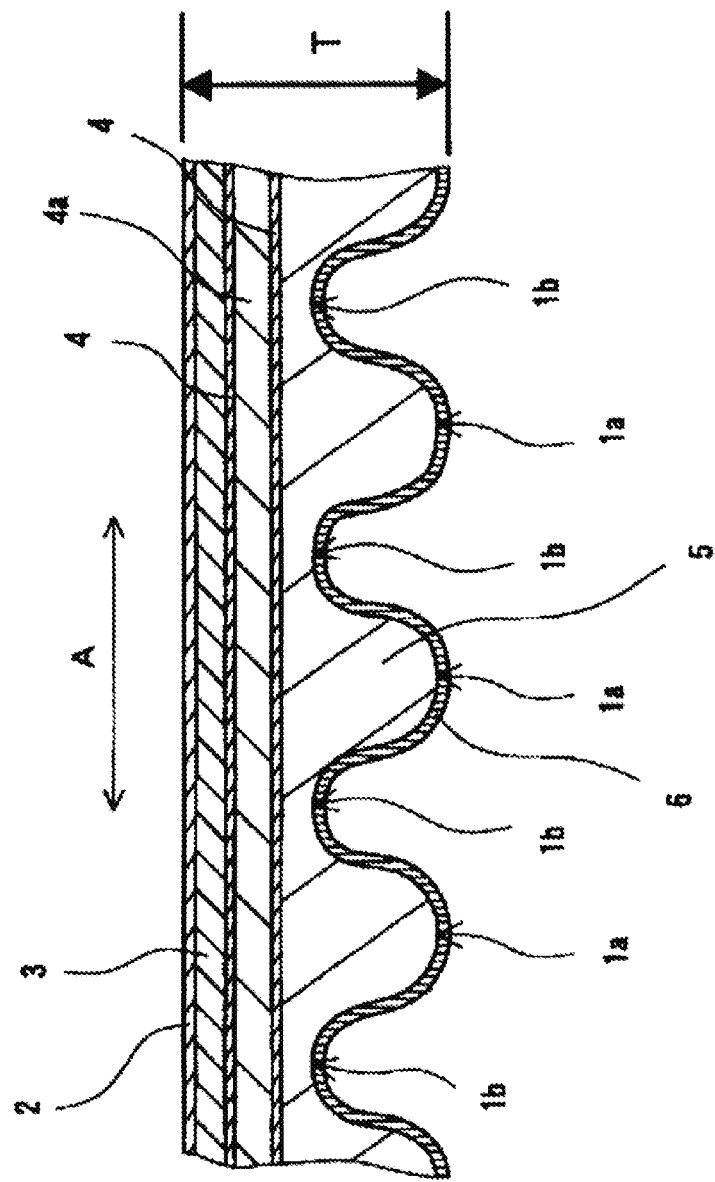
FIG. 3 is a schematic cross-sectional diagram illustrating the power transmission V-belt of FIG. 2.

FIG. 2 is a schematic perspective diagram illustrating one example (raw-edge cogged V-belt) of the power transmission V-belt of the present invention, and FIG. 3 is a schematic cross-sectional diagram after cutting the power transmission V-belt of FIG. 2 in the longitudinal direction of the belt.

In this example, the power transmission V-belt 1 has, on the inner circumferential surface of the belt body, a plurality of cog crests 1a formed at predetermined intervals along the longitudinal direction (direction A in the figure) of the belt. The cross-sectional shape of the cog crest 1a in the longitudinal direction is formed to be substantially semicircular (curved or waved), and the cross-sectional shape in the direction (width direction or direction B in the figure) orthogonal to the longitudinal direction is formed to be trapezoidal decreasing in belt width from the outer circumferential side to the inner circumferential side (cog crest 1a side) of the belt. More specifically, each cog crest 1a is projected in the belt thickness direction from the cog bottom 1b in the form of having a substantially semicircular cross-sectional shape in the longitudinal direction (direction A), and the projected protrusion with a substantially semicircular cross-section continues along the longitudinal direction (direction A).

The power transmission V-belt 1 has a laminated structure, and from the outer circumferential side toward the inner circumferential side (the side in which the cog crest 1a is formed) of the belt, a reinforcing fabric 2, a tension rubber layer 3, an adhesion rubber layer 4, a compression rubber layer 5, and a reinforcing fabric (reinforcing fabric covering the cog crest 1a and the cog bottom 1b) 6 are sequentially stacked. That is, the tension rubber layer 3 and the compression rubber layer 5 are stacked via the adhesion rubber layer 4, and the reinforcing fabrics 2 and 6 are stacked on the tension rubber layer 3 and the compression rubber layer 5, respectively. Furthermore, a tension member 4a is embedded inside the adhesion rubber layer 4, and the cog part (cog crest 1a and the cog bottom 1b) is formed in the compression rubber layer 5 by means of a cogged mold.

[Adhesion Rubber Layer]

The adhesion rubber layer (adhesion layer) is interposed between the tension rubber layer and the compression rubber layer and bonds the tension rubber layer to the compression rubber layer, and at least part of the tension member is embedded in or contacted with the adhesion rubber layer (adhesion layer). The adhesion rubber layer is preferably formed of a vulcanized rubber composition containing a rubber component and a filler.

(Rubber Component)

Examples of the rubber component include known vulcanizable or crosslinkable rubber components and/or elastomers, for example, a diene rubber [e.g., natural rubber, isoprene rubber, butadiene rubber, chloroprene rubber (CR), styrene butadiene rubber (SBR), vinylpyridine-styrene-butadiene copolymer rubber, acrylonitrile butadiene rubber (nitrile rubber); and a hydrogenated product of the diene rubber above, such as hydrogenated nitrile rubber (including a mixed polymer of hydrogenated nitrile rubber and unsaturated carboxylic acid metal salt)], an olefin rubber [e.g., ethylene-α-olefin rubber (ethylene-α-olefin elastomer), polyoctenylene rubber, ethylene-vinyl acetate copolymer rubber, chlorosulfonated polyethylene rubber, alkylated chlorosulfonated polyethylene rubber], an epichlorohydrin rubber, an acrylic rubber, a silicone rubber, a urethane rubber, and a fluororubber. One of these rubber components may be used alone, or two or more thereof may be used in combination.

Among these rubber components, in view of ease of diffusion of a vulcanizing agent and a vulcanization accelerator, an ethylene-α-olefin elastomer (an ethylene-α-olefin rubber such as ethylene-propylene copolymer (EPM) and ethylene-propylene-diene terpolymer (EPDM)) and chloroprene rubber are widely used, and among others, in the case of a belt used in a high-load environment, such as variable speed belt, chloroprene rubber and EPDM are preferred because of excellent balance of mechanical strength, weather resistance, heat resistance, cold resistance, oil resistance, adhesiveness, etc. Furthermore, chloroprene rubber also has excellent wear resistance, in addition to the above-described properties, and therefore, is particularly preferred. The chloroprene rubber may be of sulfur-modified type or may be of non-sulfur-modified type.

In the case where the rubber component contains a chloroprene rubber, the proportion of the chloroprene rubber in the rubber component may be 50 mass % or more (particularly, approximately from 80 to 100 mass %) and above all, preferably 100 mass % (only chloroprene rubber).

(Filler)

The filler includes, for example, carbon black, silica, clay, calcium carbonate, talc, and mica. The filler often contains a reinforcing filler, and the reinforcing filler may be carbon black, reinforcing silica, etc. The reinforcing property of the silica is usually smaller than the reinforcing property of the carbon black. One of these fillers may be used alone, or two or more thereof may be used in combination. In the present invention, in order to drastically enhance the fatigue fracture resistance and wear resistance, the filler preferably contains at least a reinforcing filler (particularly, carbon black), and it is also preferable to contain a carbon black and a silica (for example, reinforcing silica).

The average particle diameter of the carbon black is, for example, approximately from 5 to 200 nm, preferably from 10 to 150 nm, more preferably from 15 to 100 nm, and in view of high reinforcing effect, the filler may also contain carbon black having a small particle diameter, for example, an average particle diameter of approximately from 5 to 38 nm, preferably from 10 to 35 nm, more preferably from 15 to 30 nm. Examples of the carbon black having a small particle diameter include SAF, ISAF-HM, ISAF-LM, HAF-LS, HAF, and HAF-HS. These carbon blacks may be used individually or in combination.

The carbon black can prevent reduction in processability even when blended in a large amount and can enhance the dynamic properties (elastic modulus) of the adhesion rubber layer. Furthermore, the carbon black can reduce the coefficient of friction of the adhesion rubber layer and can enhance the wear resistance of the adhesion rubber layer. If the content of the carbon black is increased, the bending fatigue resistance may decrease.

The proportion of the carbon black can be selected from the range of approximately from 20 to 100 parts by mass (for example, from 20 to 80 parts by mass, preferably from 20 to 60 parts by mass) per 100 parts by mass of the rubber component and usually, may be approximately from 20 to 50 parts by mass (for example, from 25 to 50 parts by mass), preferably from 25 to 45 parts by mass (for example, from 30 to 40 parts by mass). If the proportion of the carbon black is too small, the elastic modulus may be insufficient and the fatigue fracture resistance or wear resistance may be deteriorated, and if it is too large, the elastic modulus may be excessively increased to deteriorate the bending fatigue resistance.

In order to enhance the adhesiveness of the adhesion rubber layer without reducing the dynamic properties of the adhesion rubber layer, the filler preferably further contains a silica (reinforcing silica, etc.). The silica (for example, reinforcing silica) is an ultrafine and bulky white powder formed of silicic acid (anhydrous or hydrous silicic acid) and/or silicate and can be chemically bonded to the rubber component, because a plurality of silanol groups are present on the surface thereof.

Examples of the silica include dry silica, wet silica, and surface-treated silica. In addition, the silica can also be classified into, for example, dry process white carbon, wet process white carbon, colloidal silica, precipitated silica, and gel process silica (silica gel), according to the classification by production process. One of these silicas may be used alone, or two or more thereof may be used in combination. Of those, wet process white carbon containing hydrous silicic acid as a main component is preferred in view of having many surface silanol groups and exhibiting strong chemical bonding force to rubber.

The average particle diameter of silica is, for example, approximately from 1 to 1,000 nm, preferably from 3 to 300 nm, more preferably from 5 to 100 nm (particularly, from 10 to 50 nm). If the particle diameter of silica is too large, mechanical properties of the adhesion rubber layer may be deteriorated, and if it is too small, uniform dispersion may be difficult.

The silica may be either nonporous or porous, but the nitrogen adsorption specific surface area by BET method may be, for example, approximately from 50 to 400 m$^2$/g, preferably from 70 to 350 m$^2$/g, more preferably from 100 to 300 m$^2$/g (particularly, from 150 to 250 m$^2$/g). If the specific surface area is too large, uniform dispersion may be difficult, and if the specific surface area is too small, mechanical properties of the adhesion rubber layer may be deteriorated.

The proportion of the silica may be, for example, approximately from 5 to 35 parts by mass (for example, from 10 to 35 parts by mass), preferably from 10 to 30 parts by mass (for example, from 15 to 25 parts by mass), more preferably from 12 to 25 parts by mass (for example, from 15 to 20 parts by mass), per 100 parts by mass of the rubber component. If the proportion of the silica is too small, the effect of enhancing adhesiveness may not be developed.

The mass ratio of the carbon black and the silica (former/latter) may be selected from the range of approximately from 40/60 to 100/0 (for example, from 45/55 to 90/10) and may be, for example, approximately from 40/60 to 85/15 (for example, from 50/50 to 80/20), preferably from 60/40 to 75/25 (for example, from 60/40 to 70/30). The proportion of the silica is usually smaller than the proportion of the carbon black in many cases.

The proportion of the carbon black may be 50 mass % or more (for example, 60 mass % or more) relative to the entire filler. If the proportion of the carbon black is too small, the dynamic properties of the adhesion rubber layer may be deteriorated.

The proportion (total proportion) of the filler may be selected from the range of approximately from 30 to 100 parts by mass per 100 parts by mass of the rubber component and may be, for example, approximately from 30 to 75 parts by mass, preferably from 35 to 70 parts by mass, more preferably from 40 to 65 parts by mass (for example, from 45 to 60 parts by mass). If the proportion of the filler is too small, the wear resistance may be deteriorated due to decrease in the elastic modulus and on the contrary, if it is too large, the elastic modulus may be excessively increased to generate much heat, leading to early occurrence of cracking in the tension rubber layer and the compression rubber layer.

(Additive)

The rubber composition for forming the adhesion rubber layer may contain, if desired, a vulcanizing agent or cross-linking agent, a co-crosslinking agent, a vulcanization aid, a vulcanization accelerator, a vulcanization retarder, a metal oxide (e.g., zinc oxide, magnesium oxide, lead oxide, calcium oxide, barium oxide, iron oxide, copper oxide, titanium oxide, aluminum oxide), a softener (e.g., oils such as paraffin oil and naphthenic oil), a processing agent or processing aid (e.g., a fatty acid such as stearic acid, a fatty acid metal salt such as stearic acid metal salt, a fatty acid amide such as stearic acid amide, wax, paraffin), an adhesiveness improver [e.g., a resorcin-formaldehyde co-condensate (RF condensate), an amino resin (a condensate of a nitrogen-containing cyclic compound and formaldehyde, for example, a melamine resin such as hexamethylolmelamine or hexaalkoxymethylmelamine (hexamethoxymethylmelamine, hexabutoxymethylmelamine, etc.), a urea resin such as methylolurea, and a benzoguanamine resin such as methylolbenzoguanamine resin), a co-condensate thereof (resorcin-melamine-formaldehyde co-condensate, etc.)], a short fiber (e.g., polyester short fiber, aramid short fiber), an age resister (e.g., antioxidant, thermal age resister, antiflex-cracking agent, antiozonant), a colorant, a tackifier, a plasticizer, a lubricant, a coupling agent (e.g., silane coupling agent), a stabilizer (e.g., ultraviolet absorber, thermal stabilizer), a flame retardant, an antistatic agent, etc. Incidentally, the metal oxide may act as a crosslinking agent. In the adhesiveness improver, the resorcin-formaldehyde co-condensate and amino resin may be an initial condensate (prepolymer) of resorcin and/or a nitrogen-containing cyclic compound such as melamine, and formaldehyde.

As the vulcanizing agent or crosslinking agent, a conventional component may be used according to the kind of the rubber component, and examples thereof include the above-described metal oxide vulcanizing agent (e.g., magnesium oxide, zinc oxide, lead oxide), an organic peroxide (e.g., diacyl peroxide, peroxy ester, dialkyl peroxide), and a sulfur-based vulcanizing agent. The sulfur-based vulcanizing agent includes, for example, powder sulfur, precipitated sulfur, colloidal sulfur, insoluble sulfur, highly dispersive sulfur, and sulfur chloride (e.g., sulfur monochloride, sulfur dichloride). One of these crosslinking agents or vulcanizing agents may be used alone, or two or more thereof may be used in combination. In the case where the rubber component is chloroprene rubber, a metal oxide (e.g., magnesium oxide, zinc oxide) may be used as the vulcanizing agent or crosslinking agent. The metal oxide may be used in combination with other vulcanizing agent (e.g., sulfur-based vulcanizing agent), and the metal oxide and/or sulfur-based vulcanizing agent may be used exclusively or may be used in combination with a vulcanization accelerator.

The proportion of the vulcanizing agent may be selected from the range of approximately from 1 to 20 parts by mass per 100 parts by mass of the rubber component. For example, the proportion of the metal oxide as the vulcanizing agent may be selected from the range of approximately from 1 to 20 parts by mass, preferably from 3 to 17 parts by mass, more preferably from 5 to 15 parts by mass (for example, from 7 to 13 parts by mass), per 100 parts by mass of the rubber component, and the proportion of the organic peroxide may be selected from the range of approximately from 1 to 8 parts by mass, preferably from 1.5 to 5 parts by mass, more preferably from 2 to 4.5 parts by mass, per 100 parts by mass of the rubber composition.

Examples of the co-crosslinking agent (crosslinking aid or co-agent) include known crosslinking aids, for example, a polyfunctional(iso)cyanurate [e.g., triallyl isocyanurate (TAIL), triallyl cyanurate (TAC)], a polydiene (e.g., 1,2-polybutadiene), a metal salt of unsaturated carboxylic acid [e.g., a (meth)acrylic acid polyvalent metal salt such as zinc (meth)acrylate and magnesium (meth)acrylate], oximes (e.g., quinone dioxime), guanidines (e.g., diphenyl guanidine), a polyfunctional (meth)acrylate [e.g., an alkanediol di(meth)acrylate such as ethylene glycol di(meth)acrylate and butanediol di(meth)acrylate, an alkanepolyol poly(meth)acrylate such as trimethylolpropane tri(meth)acrylate and pentaerythritol tetra(meth)acrylate], and bismaleimides (e.g., an aliphatic bismaleimide, for example, an alkylen-ebismaleimide such as N,N'-1,2-ethylenedimaleimide, N,N'-hexamethylenebismaleimide and 1,6'-bismaleimide-(2,2,4-trimethyl)cyclohexane; an arene bismaleimide or aromatic bismaleimide, such as N,N'-m-phenylenedimaleimide, 4-methyl-1,3-phenylenedimaleimide, 4,4'-diphenylmeth-anedimaleimide, 2,2-bis[4-(4-maleimidephenoxy)phenyl] propane, 4,4'-diphenyletherdimaleimide, 4,4'-diphe-nylsulfonedimaleimide, and 1,3-bis(3-maleimidephenoxy) benzene). One of these crosslinking aids may be used alone, or two or more thereof may be used in combination. Among these crosslinking aids, a polyfunctional (iso)cyanurate, a polyfunctional (meth)acrylate, bismaleimides (an arene bismaleimide or aromatic bismaleimide, such as N,N'-m-phe-nylenedimaleimide) are preferred, and bismaleimides are used in many cases. The addition of a crosslinking aid (e.g., bismaleimides) can increase the degree of crosslinking to prevent adhesive wear.

The proportion of the co-crosslinking agent (crosslinking aid) such as bismaleimide may be selected from the range of, in terms of solid content, approximately from 0.1 to 10 parts by mass per 100 parts by mass of the rubber component and, usually, the proportion may be approximately from 0.5 to 6 parts by mass, preferably from 0.5 to 5 parts by mass (for example, from 1 to 5 parts by mass), more preferably from 1.5 to 3 parts by mass (for example, from 1.5 to 2.5 parts by mass) and usually, may be approximately from 1 to 3 parts by mass (for example, from 1 to 2.5 parts by mass).

Examples of the vulcanization accelerator include, for example, a thiuram-based accelerator [e.g., tetramethylthi-uram monosulfide (TMTM), tetramethylthiuram disulfide (TMTD), tetraethylthiuram disulfide (TETD), tetrabutylthi-uram disulfide (TBTD), dipentamethylenethiuram tetrasul-fide (DPTT), N,N'-dimethyl-N,N'-diphenylthiuram disul-fide], a thiazole-based accelerator [e.g., 2-mercaptobenzothiazole, a zinc salt of 2-mercaptobenzo-thiazole, 2-mercaptothiazoline, dibenzothiazyl disulfide, 2-(4'-morpholinodithio)benzothiazole], a sulfenamide-based accelerator [e.g., N-cyclohexyl-2-benzothiazyl sulfenamide (CBS), N,N'-dicyclohexyl-2-benzothiazyl sulfenamide], guanidines (e.g., diphenyl guanidine, di-o-tolyl guanidine), a urea- or thiourea-based accelerator (e.g., ethylene thiourea), dithiocarbamates, and xanthates. One of these vulcanization accelerators may be used alone, or two or more thereof may be used in combination. Among these vulcanization accelerators, TMTD, DPTT, CBS, etc. are widely used.

The proportion of the vulcanization accelerator may be, for example, in terms of solid content, approximately from 0.1 to 15 parts by mass (for example, from 0.3 to 10 parts by mass), preferably from 0.5 to 5 parts by mass (for example, from 0.5 to 3 parts by mass), per 100 parts by mass of the rubber component and may be approximately from 0.3 to 2.5 parts by mass (for example, from 0.5 to 1.5 parts by mass).

The proportion of the softener (oils such as naphthenic oil) may be, for example, approximately from 1 to 30 parts by mass (for example, from 3 to 20 parts by mass), preferably from 3 to 10 parts by mass (for example, from 3 to 8 parts by mass), per 100 parts by mass of the total amount of the rubber component. In addition, the proportion of the processing agent or processing aid (e.g., stearic acid) may be approximately 10 parts by mass or less (for example, from 0 to 10 parts by mass), preferably from 0.1 to 5 parts by mass (for example, from 0.5 to 3 parts by mass), more preferably from 1 to 3 parts by mass (for example, from 1.5 to 2.5 parts by mass), per 100 parts by mass of the rubber component.

The proportion of the adhesiveness improver (e.g., resorcin-formaldehyde co-condensate, hexamethoxymethylmelamine) may be approximately from 0.1 to 20 parts by mass (for example, from 0.2 to 10 parts by mass), preferably from 0.3 to 5 parts by mass (for example, from 0.5 to 2.5 parts by mass), more preferably from 0.5 to 3 parts by mass (for example, from 0.5 to 1.5 parts by mass), per 100 parts by mass of the rubber component.

The proportion of the age resister may be, for example, approximately from 0.5 to 15 parts by mass, preferably from 1 to 10 parts by mass, more preferably from 2.5 to 7.5 parts by mass (particularly, from 3 to 7 parts by mass), per 100 parts by mass of the total amount of the rubber component.

[Tension Member]

As the tension member embedded in the adhesion rubber layer, usually, cords (twisted cords) disposed at predetermined intervals in the belt width direction may be used. The cords are arranged extending in the longitudinal direction of the belt and, usually, are juxtaposedly arranged at a predetermined pitch in parallel to the longitudinal direction of the belt. With respect to the tension member or cord, a part thereof is embedded in the adhesion rubber layer, and for the reason that the durability can be enhanced, an embodiment where the cord is embedded in the adhesion rubber layer (an embodiment where the entirety of the cord is completely embedded in the adhesion rubber layer) is preferred.

As the fiber constituting the cord, for example, a synthetic fiber such as polyolefin fiber (e.g., polyethylene fiber, polypropylene fiber), polyamide fiber (e.g., polyamide 6 fiber, polyamide 66 fiber, polyamide 46 fiber, aramid fiber), polyester fiber (a polyalkylene arylate fiber) [e.g., a poly $C_{2-4}$ alkylene $C_{6-14}$ arylate fiber such as polyethylene terephthalate (PET) fiber and polyethylene naphthalate (PEN) fiber], vinylon fiber, polyvinyl alcohol fiber and polyparaphenylene benzobisoxazole (PBO) fiber; a natural fiber such as cotton, hemp and wool; and an inorganic fiber such as carbon fiber, are widely used. One of these fibers may be used alone, or two or more thereof may be used in combination.

Of these fibers, in view of high modulus, for example, a synthetic fiber such as polyester fiber (polyalkylene arylate fiber) containing, as a main constituent unit, a $C_{2-4}$ alkylene arylate such as ethylene terephthalate and ethylene-2,6-naphthalate, and polyamide fiber (e.g., aramid fiber), and an inorganic fiber such as carbon fiber, are widely used, and a polyester fiber (particularly, polyethylene terephthalate fiber and polyethylene naphthalate fiber) and a polyamide fiber (particularly, aramid fiber) are preferred.

The fiber may be a multifilament yarn. The fineness of the multifilament yarn may be, for example, approximately from 2,000 to 10,000 deniers (particularly, from 4,000 to 8,000 deniers). The multifilament yarn may contain, for example, approximately from 100 to 5,000 monofilament yarns and may preferably contain approximately from 500 to 4,000, more preferably from 1,000 to 3,000, monofilament yarns.

Usually, a twisted cord (e.g., organzine, single-twist, Lang lay) using a multifilament yarn can be used as the cord. The average wire diameter of the cord (the fiber diameter of twisted cord) may be, for example, approximately from 0.5 to 3 mm, preferably from 0.6 to 2 mm, more preferably from 0.7 to 1.5 mm.

In order to enhance adhesiveness to the adhesion rubber layer, the cord may be subjected to a surface treatment. Examples of the surface treating agent include an RFL solution containing resorcin (R), formaldehyde (F) and rubber or latex (L) (for example, an RFL solution containing a condensate (RF condensate) formed by resorcin (R) and formaldehyde (F) and the rubber component above, e.g., vinylpyridine-styrene-butadiene copolymer rubber), and a vulcanized rubber composition containing an epoxy compound, a polyisocyanate compound, a silane coupling agent, the above-described rubber component, and the above-described silica (for example, wet process white carbon containing a surface silanol group and containing, as a main component, a hydrous silicic acid favorable to increasing the chemical bonding force to rubber). One of these surface treating agents may be used alone, or two or more thereof may be used in combination. Furthermore, the treatment may be performed a plurality of times sequentially with the same or different surface treating agents. The cord is preferably subjected to an adhesion treatment at least with the RFL solution.

(Structure and Properties of Adhesion Rubber Layer)

In the present invention, the hardness H1 of the adhesion rubber layer is formed to be high on the compression rubber layer side and low on the tension rubber layer side. The rubber hardness H1 of the adhesion rubber layer may be formed to decrease stepwise (or in layered manner) or continuously from the compression rubber layer side toward the tension rubber layer side. In the embodiment where at least part of the tension member (cord) is embedded in the adhesion rubber layer, the rubber hardness $H1_2$ on the tension rubber layer side (top surface side or outer circumferential side) relative to the tension member is formed to change stepwise or continuously and become smaller than the rubber hardness $H1_3$ on the compression rubber layer side (bottom surface side or inner circumferential side) ($H1_2 < H1_3$). Accordingly, the hardness H1 of the adhesion rubber layer can be expressed as the rubber hardness having a predetermined distribution width (range) and may be expressed as an average rubber hardness (for example, a weighted average rubber hardness based on the hardness of a plurality of rubber layers and the thickness of each layer). Such an adhesion rubber layer may have a plurality of adhesion rubber layers differing in the rubber hardness, for example, at least a first adhesion rubber layer put into contact with the tension rubber layer and a second adhesion rubber layer put into contact with the compression rubber layer, and the tension member may be interposed between the first adhesion rubber layer and the second adhesion rubber layer while contacting with these adhesion rubber layers, directly or via one or a plurality of intermediate rubber layers.

More specifically, the adhesion rubber layer may be formed by changing, in the rubber composition for the adhesion rubber layer, a predetermined component affecting the hardness of the rubber layer and its quantitative ratio. For example, the adhesion rubber layer may be formed by more increasing the content of a softening component such as softener and plasticizer on the tension rubber layer side than on the compression rubber layer side. Alternatively, the adhesion rubber layer may be formed by more decreasing the content of a component selected from a filler, a vulcanizing agent or crosslinking agent, a co-crosslinking agent (e.g., bismaleimides), etc., particularly, at least one component selected from a filler and a co-crosslinking agent (e.g., bismaleimides), on the tension rubber layer side than on the compression rubber layer side. Out of these components, the filler may contain at least a reinforcing filler (e.g., carbon black) and may contain a reinforcing filler (e.g., carbon black) and an inorganic filler (e.g., silica such as reinforcing silica), and the reinforcing filler may contain carbon black and reinforcing silica. The rubber hardness H1 of the adhesion rubber layer is often adjusted by the content of at least one component selected from a filler containing at least a carbon black, and a bismaleimide. More specifically, the content of at least one component selected from a carbon black, a silica (e.g., reinforcing silica) and a co-crosslinking agent (e.g., bismaleimides) (particularly, at least carbon black and a co-crosslinking agent (e.g., bismaleimides)) is more increased in the second adhesion rubber layer put into contact with the compression rubber layer than in the first adhesion rubber layer put into contact with the tension rubber layer, and the rubber hardness on the compression rubber layer side can thereby be made larger than on the tension rubber layer side.

A representative rubber composition for forming the adhesion rubber layer may contain a filler at a ratio of, for example, approximately from 30 to 75 parts by mass, preferably from 35 to 70 parts by mass, more preferably from 40 to 65 parts by mass (for example, from 45 to 60 parts by mass), per 100 parts by mass of the rubber component (e.g., chloroprene rubber). In addition, per 100 parts by mass of the rubber component (e.g., chloroprene rubber), out of the filler, a carbon black may be contained at a ratio of, for example, approximately from 20 to 50 parts by mass (for example, from 25 to 50 parts by mass), preferably from 25 to 45 parts by mass (for example, from 30 to 40 parts by mass), and a silica (e.g., reinforcing silica) may be contained at a ratio of, for example, approximately from 10 to 30 parts by mass, preferably from 12 to 25 parts by mass (for example, from 15 to 20 parts by mass).

Furthermore, per 100 parts by mass of the rubber component (e.g., chloroprene rubber), the content of the vulcanizing agent (e.g., metal oxide vulcanizing agent) may be, for example, approximately from 1 to 20 parts by mass (for example, from 3 to 17 parts by mass), preferably from 5 to 15 parts by mass (for example, from 7 to 13 parts by mass), and the content of the co-crosslinking agent (e.g., bismaleimides) may be, for example, approximately from 0.3 to 7 parts by mass (for example, from 0.5 to 5 parts by mass), preferably from 0.7 to 4 parts by mass (for example, from 1 to 3 parts by mass).

In such an adhesion rubber layer, the first adhesion rubber layer put into contact with the tension rubber layer may contain the filler at a ratio of, for example, approximately from 25 to 65 parts by mass (for example, from 30 to 62 parts by mass), preferably from 40 to 60 parts by mass (for example, from 45 to 55 parts by mass), per 100 parts by mass of the rubber component (e.g., chloroprene rubber). In addition, per 100 parts by mass of the rubber component (e.g., chloroprene rubber), the content of the carbon black may be, for example, approximately from 20 to 50 parts by mass (for example, from 25 to 45 parts by mass), preferably from 30 to 40 parts by mass (for example, from 30 to 35 parts by mass), and the content of the silica (e.g., reinforcing silica) may be, for example, approximately from 5 to 30 parts by mass (for example, from 10 to 25 parts by mass), preferably from 12 to 23 parts by mass (for example, from 15 to 20 parts by mass). The content of the co-crosslinking agent (e.g., bismaleimides) may be, for example, approximately from 0.3 to 5 parts by mass (for example, 0.5 to 3 parts by mass), preferably from 0.7 to 2.5 parts by mass (for example, from 1 to 2 parts by mass), per 100 parts by mass of the rubber component (e.g., chloroprene rubber). The content of the vulcanizing agent (e.g., metal oxide vulcanizing agent) may be the same as the content in the adhesion rubber layer above.

Furthermore, the second adhesion rubber layer put into contact with the compression rubber layer may contain, per 100 parts by mass of the rubber component (e.g., chloroprene rubber), the filler at a ratio of, for example, approximately from 45 to 70 parts by mass, preferably from 50 to 65 parts by mass (for example, from 55 to 65 parts by mass), may contain a carbon black at a ratio of, for example, approximately from 30 to 60 parts by mass (for example, from 30 to 50 parts by mass), preferably from 35 to 50 parts by mass (for example, from 35 to 45 parts by mass), and may contain a silica (e.g., reinforcing silica) at a ratio of, for example, approximately from 10 to 30 parts by mass (for example, from 15 to 25 parts by mass). The content of the co-crosslinking agent (e.g., bismaleimides) may be, for example, approximately from 1 to 7 parts by mass (for example, 1.5 to 5 parts by mass), preferably from 1.5 to 4.5 parts by mass (for example, from 2 to 4 parts by mass), per 100 parts by mass of the rubber component (e.g., chloroprene rubber). The content of the vulcanizing agent (e.g., metal oxide vulcanizing agent) may be the same as the content in the adhesion rubber layer above.

The ratio (mass ratio) of the content of the filler in the first adhesion rubber layer and the content of the filler in the second adhesion rubber layer, former/latter, may be approximately from 60/100 to 99/100, preferably from 65/100 to 95/100, more preferably from 70/100 to 93/100. The ratio (mass ratio) of the content of carbon black in the first adhesion rubber layer and the content of carbon black in the second adhesion rubber layer, former/latter, may be approximately from 60/100 to 97/100, preferably from 65/100 to 95/100, more preferably from 70/100 to 90/100. The ratio (mass ratio) of the content of silica in the first adhesion rubber layer and the content of silica in the second adhesion rubber layer, former/latter, may be approximately from 60/100 to 110/100, preferably from 65/100 to 105/100, more preferably from 70/100 to 100/100.

Furthermore, the ratio (mass ratio) of the content of the co-crosslinking agent (e.g., bismaleimides) in the first adhesion rubber layer and the content of the co-crosslinking agent in the second adhesion rubber layer, former/latter, may be approximately from 10/100 to 80/100, preferably from 15/100 to 70/100, more preferably from 20/100 to 60/100.

The rubber hardness H1 of the adhesion rubber layer may be, for example, approximately from 70 to 85° (for example, from 72 to 84°), preferably from 73 to 83° (for example, from 74 to 82°), and may be approximately from 74 to 85° (for example, from 75 to 84°), preferably from 78 to 83° (for example, from 80 to 82°).

In the adhesion rubber layer, the rubber hardness $H1_2$ on the tension rubber layer side (top surface side or outer circumferential side) (for example, the rubber hardness of the first adhesion rubber layer) may be, for example, approximately from 70 to 83° (for example, from 72 to 82°), preferably from 74 to 82° (for example, from 74 to 80°), and may be approximately from 76 to 83° (for example, from 80 to 82°). The rubber hardness $H1_3$ on the compression rubber layer side (bottom surface side or inner circumferential side) (for example, the rubber hardness of the second adhesion rubber layer) is larger than the rubber hardness on the tension rubber layer side (top surface side or outer circumferential side), and may be, for example, approximately from 77 to 85° (for example, from 78 to 85°), preferably from 78 to 84° (for example, from 79 to 83°), more preferably from 80 to 84° (for example, from 81 to 83°).

The difference ($\Delta(H1_3-H1_2)$) between the rubber hardness $H1_2$ on the tension rubber layer side (outer circumferential side) and the rubber hardness $H1_3$ on the compression rubber layer side (inner circumferential side) may be, for example, approximately from 1 to 12° (for example, from 2 to 12°), preferably from 2 to 10° (for example, from 3 to 9°), more preferably from 2 to 8°.

The hardness (or average rubber hardness) H1 of the adhesion rubber layer is usually formed to be lower than the rubber hardness H2 of the tension rubber layer and the rubber hardness H3 of the compression rubber layer, and the rubber hardness H2 of the tension rubber layer is formed to be lower than the rubber hardness H3 of the compression rubber layer (H1<H2<H3). With respect to the rubber hardness H1 of the adhesion rubber layer, the rubber hardness $H1_2$ of the first adhesion rubber layer put into contact with the tension rubber layer (the rubber hardness on the tension rubber layer side (outer circumferential side)) may be equal to the rubber hardness H2 of the tension rubber layer ($H1_2 \approx H2$) and usually, is lower than the rubber hardness H2 in many cases ($H1_2<H2$). In addition, the rubber hardness $H1_3$ of the second adhesion rubber layer put into contact with the compression rubber layer (the rubber hardness on the compression rubber layer side (inner circumferential side)) may be equal to the rubber hardness H3 of the compression rubber layer ($H1_3 \approx H3$) and usually, is lower than the rubber hardness H3 in many cases ($H1_3<H3$).

The average thickness of the adhesion rubber layer may be selected according to the type of the power transmission V-belt and may be, for example, approximately from 0.2 to 3 mm (for example, from 0.3 to 2.5 mm), preferably from 0.4 to 2.2 mm (for example, from 0.6 to 2 mm), more preferably from 0.8 to 1.5 mm (for example, from 0.8 to 1.4 mm).

In the case of reducing the thickness of the power transmission V-belt, the average thickness of the adhesion rubber layer may be, for example, approximately from 0.1 to 2.5 mm (for example, from 0.2 to 2.0 mm), preferably from 0.3 to 1.5 mm (for example, from 0.4 to 1.0 mm).

[Tension Rubber Layer and Compression Rubber Layer]

The vulcanized rubber composition for forming the tension rubber layer (back surface rubber layer or back surface layer) and the compression rubber layer (inner surface rubber layer or internal layer) may contain the same components as in the vulcanized rubber composition for the adhesion rubber layer above, for example, a rubber component (e.g., chloroprene rubber, EPDM), a vulcanizing agent or crosslinking agent (e.g., a metal oxide such as magnesium oxide and zinc oxide, a sulfur vulcanizing agent such as sulfur), a co-crosslinking agent or crosslinking aid (e.g., bismaleimides such as N,N'-m-phenylenedimaleimide), a vulcanization accelerator (e.g., TMTD, DPTT, CBS), a filler (e.g., carbon black, silica, clay, calcium carbonate, talc, mica), a softener (e.g., oils such as naphthenic oil), a processing agent or processing aid (e.g., stearic acid, stearic acid metal salt, wax, paraffin), an age resister, an adhesiveness improver, a colorant, a tackifier, a plasticizer, a coupling agent (e.g., silane coupling agent), a stabilizer (e.g., ultraviolet absorber, thermal stabilizer), a flame retardant, and an antistatic agent.

Furthermore, the vulcanized rubber composition for forming the tension rubber layer and the compression rubber layer may contain a short fiber.

As the short fiber, the same fiber as the fiber constituting the tension member may be utilized. One of short fibers formed of the fiber above may be used alone, or two or more thereof may be used in combination. Of these short fibers, for example, a synthetic fiber or a natural fiber, particularly, a synthetic fiber such as polyester fiber (polyalkylene arylate fiber) containing, as a main constituent unit, a $C_{2-4}$ alkylene $C_{6-12}$ arylate such as ethylene terephthalate and ethylene-2,6-naphthalate, and polyamide fiber (e.g., aramid fiber), and an inorganic fiber such as carbon fiber, are widely used, and above all, a rigid fiber having high strength and modulus, for example, a polyester fiber (particularly, polyethylene terephthalate fiber and ethylene naphthalate fiber) and a polyamide fiber (particularly, aramid fiber) are preferred. The aramid short fiber also has high wear resistance. Accordingly, the short fiber preferably contains at least an aramid fiber. The aramid fiber is commercially available under the trade names, for example, "CONEX", "NOMEX", "KEVLAR", "TECHNORA", and "TWARON".

The average fiber diameter of the short fiber may be 2 μm or more, for example, approximately from 2 to 100 μm, preferably from 3 to 50 μpm (for example, from 5 to 50 μm), more preferably from 7 to 40 μm (particularly from 10 to 30 μm). The average length of the short fiber may be, for example, approximately from 1 to 20 mm (for example, from 1.2 to 20 mm), preferably from 1.3 to 15 mm (for example, from 1.5 to 10 mm), more preferably from 2 to 5 mm (for example, from 2.5 to 4 mm).

In view of dispersibility or adhesiveness of the short fiber in the rubber composition, the short fiber may be subjected to an adhesion treatment (or surface treatment) by a conventional method. Furthermore, the surface (frictional power transmission surface) may be polished to allow the short fiber to protrude from the surface. The average protrusion height of the short fiber may be about 50 μm or more (for example, from 50 to 200 μm).

The short fiber suppresses compressive deformation of the belt under pressing force from the pulley and therefore, may be embedded or incorporated into the tension rubber layer and the compression rubber layer and oriented in the belt width direction.

The proportion of the short fiber may be selected from the range of approximately from 5 to 50 parts by mass per 100 parts by mass of the rubber component and, usually, may be approximately from 5 to 40 parts by mass (for example, from 10 to 35 parts by mass), preferably from 15 to 35 parts by mass (for example, from 15 to 30 parts by mass), more preferably from 20 to 30 parts by mass (for example, from 20 to 25 parts by mass).

As the rubber component, a rubber of the same series or type (e.g., diene rubber, chloroprene rubber) as the rubber component of the rubber composition for the adhesion rubber layer is used in many cases.

In the rubber composition for forming the tension rubber layer and the compression rubber layer, as long as the rubber hardness H2 of the tension rubber layer is smaller than the rubber hardness H3 of the compression rubber layer, the proportion of each component (a filler, a vulcanizing agent or crosslinking agent, a co-crosslinking agent or crosslinking aid, a softener, a plasticizer, etc.) may be selected from the same range as that in the rubber composition for the adhesion rubber layer.

In the rubber composition for the tension rubber layer and the compression rubber layer, the proportion of the filler may be selected from the range of approximately from 10 to 100 parts by mass (for example, from 15 to 80 parts by mass) per 100 parts by mass of the rubber component (e.g., chloroprene rubber) and usually, may be approximately from 20 to 70 parts by mass (for example, from 25 to 60 parts by mass), preferably from 30 to 55 parts by mass (for example, from 30 to 50 parts by mass). As the filler, at least carbon black is used in many cases and although silica may be used in combination, silica is not necessarily needed.

The proportion of the vulcanizing agent (e.g., metal oxide vulcanizing agent) may be approximately from 1 to 20 parts by mass (for example, from 3 to 17 parts by mass, preferably from 5 to 15 parts by mass, more preferably from 7 to 13 parts by mass) per 100 parts by mass of the rubber component. The proportion of the co-crosslinking agent or crosslinking aid (e.g., bismaleimides) may be selected from the range of approximately from 1.5 to 7 parts by mass per 100 parts by mass of the rubber component and usually, may be approximately from 2 to 5 parts by mass (for example, from 2.5 to 4 parts by mass), preferably from 2.5 to 3.5 parts by mass.

In the present invention, the rubber hardness $H2$ of the tension rubber layer is formed to be lower than the rubber hardness $H3$ of the compression rubber layer ($H2<H3$). The hardness of these rubber layers can be adjusted, for example, by changing, in the rubber composition for the tension rubber layer and the compression rubber layer, a predetermined component affecting the hardness of the rubber layer and its quantitative ratio. For example, the hardness may be adjusted by more increasing the content of a softening component such as softener and plasticizer in the tension rubber layer than in the compression rubber layer. Alternatively, the hardness may be adjusted by more decreasing the content of a component selected from a filler, a vulcanizing agent or crosslinking agent, a co-crosslinking agent (e.g., bismaleimides), a short fiber, etc., particularly, at least one component selected from a filler (e.g., a reinforcing filler such as carbon black) and a co-crosslinking agent (e.g., bismaleimides), in the tension rubber layer than in the compression rubber layer. Usually, the rubber hardness of the tension rubber layer and the compression rubber layer is often adjusted by incorporating at least one component selected from a reinforcing filler (e.g., carbon black), a co-crosslinking agent (e.g., bismaleimides) and a short fiber (particularly, at least one component selected from carbon black and a short fiber) at a smaller ratio in the tension rubber layer than in the compression rubber layer.

The rubber composition for the tension rubber layer may contain the filler (e.g., carbon black) at a ratio of approximately from 15 to 50 parts by mass (for example, from 20 to 40 parts by mass), preferably from 25 to 45 parts by mass (for example, from 30 to 40 parts by mass), per 100 parts by mass of the rubber component (e.g., chloroprene rubber). The content of the short fiber may be approximately from 5 to 35 parts by mass (for example, from 10 to 35 parts by mass), preferably from 15 to 30 parts by mass (for example, from 15 to 25 parts by mass), per 100 parts by mass of the rubber component (e.g., chloroprene rubber).

The rubber composition for the compression rubber layer may contain the filler (e.g., carbon black) at a ratio of approximately from 20 to 70 parts by mass (for example, from 25 to 60 parts by mass), preferably from 35 to 55 parts by mass (for example, from 40 to 50 parts by mass), per 100 parts by mass of the rubber component (e.g., chloroprene rubber). The content of the short fiber may be approximately from 10 to 40 parts by mass (for example, from 15 to 35 parts by mass), preferably from 20 to 35 parts by mass (for example, from 20 to 30 parts by mass), per 100 parts by mass of the rubber component (e.g., chloroprene rubber).

The content of each of the vulcanizing agent (e.g., metal oxide vulcanizing agent) and the co-crosslinking agent or crosslinking aid (e.g., bismaleimides) may be equal in the rubber compositions for the tension rubber layer and the compression rubber layer, or the content may be larger in the compression rubber layer than in the tension rubber layer.

The rubber hardness $H2$ of the tension rubber layer may be, for example, approximately from 80 to 92° (for example, from 81 to 92°), preferably from 82 to 92° (for example, from 82 to 90°), more preferably from 83 to 90° (for example, from 83 to 89°), and may be approximately from 80 to 86° (for example, from 82 to 85°).

The rubber hardness $H3$ of the compression rubber layer may be, for example, approximately from 86 to 98° (for example, from 87 to 97°), preferably from 88 to 96° (for example, from 89 to 95°), more preferably from 88 to 95°, and may be approximately from 86 to 95° (for example, from 86 to 93°), preferably from 87 to 92° (for example, from 88 to 91°).

The difference ($\Delta(H3-H2)$) of the rubber hardness between the tension rubber layer and the compression rubber layer may be, for example, approximately from 2 to 12° (for example, from 3 to 11°), preferably from 3 to 10° (for example, from 4 to 9°), more preferably from 4 to 8° (for example, from 5 to 7°).

The average thickness of the tension rubber layer may be selected according to the type of the power transmission V-belt and may be, for example, approximately from 0.6 to 10 mm (for example, from 0.8 to 7 mm), preferably from 1 to 6.5 mm (for example, from 1.2 to 6 mm), more preferably from 1.4 to 5.2 mm (for example, from 1.6 to 5 mm), and the average thickness of the compression rubber layer may be, according to the type of the belt, for example, approximately from 2 to 25 mm (for example, from 3 to 20 mm), preferably from 3 to 18 mm (for example, from 3 to 16 mm), more preferably from 4 to 15 mm (for example, from 5 to 12 mm).

In the case of reducing the thickness of the power transmission V-belt, the average thickness of the tension rubber layer may be, for example, approximately from 0.4 to 5 mm (for example, from 0.5 to 4 mm), preferably from 0.6 to 3 mm (for example, from 0.7 to 2.5 mm), and the average thickness of the compression rubber layer may be, for example, approximately from 1 to 10 mm (for example, from 1.5 to 9 mm), preferably from 2 to 8 mm (for example, from 3 to 7 mm).

On the inner circumferential surface side of the compression rubber layer of this embodiment, a cog having a cog crest and a cog trough is formed. The shape of the cog is not particularly limited and may be, for example, a curved waveform shape.

[Reinforcing Fabric]

A reinforcing fabric layer is not necessarily needed. Even in the case of providing a reinforcing fabric layer, the configuration is not limited to a configuration where a reinforcing fabric for forming the reinforcing fabric layer is stacked on both the tension rubber layer and the compression rubber layer (in the case where cogs are formed integrally with the compression rubber layer, the cogs) (on the top surface of the tension rubber layer and the bottom surface of the compression rubber layer). For example, the configuration may be a configuration where a reinforcing fabric is stacked on the surface of either one rubber layer of the tension rubber layer and the compression rubber layer (including cogs), or a configuration where a reinforcing layer is embedded in the compression rubber layer and/or the tension rubber layer (for example, the configuration described in JP-A-2010-230146). In many cases, the reinforcing fabric is used in a configuration of stacking it on the surface of at least either one rubber layer of the tension rubber layer and the compression rubber layer (on the top surface of the tension rubber layer and/or the bottom surface of the compression rubber layer), for example, a configuration of stacking the reinforcing fabric on both the top surface of the tension rubber layer and the compression rubber layer.

The reinforcing fabric may be formed of, for example, a fabric material such as woven fabric, wide-angle canvas fabric, knitted fabric and nonwoven fabric (preferably a woven fabric) and after being subjected, if desired, to an adhesion treatment, for example, a treatment with RFL solution (e.g., immersion treatment), a friction treatment of rubbing an adhesion rubber into the fabric material, or lamination (coating) of the adhesion rubber and the fabric material, may be stacked on or embedded in the compression rubber layer and/or the tension rubber layer in the above-described configuration.

In the present invention, the hardness of the rubber layer is adjusted, in addition to the laminate structure above, and therefore, even when the belt thickness is reduced, high durability and fuel consumption saving (or power transmission efficiency) are achieved during running in severe conditions. The average thickness of the power transmission V belt of the present invention may be, for example, approximately 12 mm or less (for example, from 3 to 12 mm), preferably 10 mm or less (for example, from 5 to 10 mm), more preferably 9 mm or less (for example, from 6 to 9 mm), and in particular, from 6.5 to 8.5 mm Here, the thickness of the power transmission V-belt means the thickness of the entire belt; when a reinforcing fabric 2 is formed, means the total thickness of the reinforcing fabric 2, the tension rubber layer 3, the adhesion rubber layer 4 having embedded therein at least part of the tension member, and the compression rubber layer 5; and furthermore, when cogs and a reinforcing fabric 6 are formed as illustrated in FIG. 2 and FIG. 3, means the total thickness T from the reinforcing fabric 2 to the reinforcing fabric 6 on the cog (cog crest 1a).

Usually, both side surfaces of each rubber layer of the power transmission V-belt above are preferably exposed so as to contact with the pulley and thereby perform frictional power transmission.

[Production Method of Power Transmission V-Belt]

The production method of the power transmission V-belt of the present invention is not particularly limited, and with respect to the step of stacking respective layers (production method of a belt sleeve), a conventional method can be utilized according to the type of the belt.

For example, describing a typical production method of a cogged V-belt, first, a laminate of a reinforcing fabric (bottom fabric) and a compression rubber layer sheet (unvulcanized rubber sheet) is placed by arranging the reinforcing fabric to come into contact with a cogged flat mold having alternating tooth portions and groove portions and press-pressurized at a temperature of approximately from 60 to 100° C. (particularly, from 70 to 80° C.) to manufacture a cog pad having embossed cog portions (a pad that is not completely vulcanized and is in a semi-vulcanized state). Both ends of this cog pad may be vertically cut from an appropriate position (particularly, the top of a cog crest). Furthermore, a cylindrical mold is covered with an inner matrix having alternating tooth portions and groove portions, the cog pad is wound by engaging with the tooth portions and the groove portions to joint at both ends (particularly, at the top of the cog crest), a second adhesion rubber layer sheet (lower adhesion rubber: unvulcanized rubber sheet) is stacked on the cog pad wound, a cord (twisted cord) for forming the tension member is spun spirally, and a first adhesion rubber layer sheet (upper adhesion rubber: unvulcanized rubber sheet), a tension rubber layer sheet (unvulcanized rubber) and a reinforcing fabric (top fabric) are sequentially wound thereon to manufacture a molded article.

The molded article is then covered with a jacket and after placing the mold in a vulcanization can, vulcanized at a temperature of approximately from 120 to 200° C. (particularly, from 150 to 180° C.) to prepare a belt sleeve. Thereafter, the sleeve is cut into a V-shape by means of a cutter, etc.

The adhesion rubber layer can be formed of a plurality of adhesion rubber layer sheets, and the cord (twisted cord) for forming the tension member may be spun in relation to the stacking order of the plurality of adhesion rubber layer sheets according to the embedding position in the adhesion rubber layer. In addition, as described above, cogs need not necessarily be formed, and the reinforcing fabric (bottom fabric and top fabric) is not necessarily needed.

EXAMPLES

The present invention is described in greater detail below based on Examples, but the present invention is not limited by these Examples. The measurement methods or evaluation methods for raw materials and physical properties used in Examples are shown below. Unless otherwise indicated, the "parts" and "%" are on the mass basis.

[Raw Materials]

Chloroprene rubber: "PM-40" produced by Denki Kagaku Kogyo K.K.

Carbon black: "Seast 3" produced by Tokai Carbon Co., Ltd.

Silica: "Nipsil VN3" produced by Tosoh Silica Corporation

Naphthenic oil: "NS-900" produced by Idemitsu Kosan Co., Ltd.

Magnesium oxide

Resorcin•formalin copolymer (resorcinol resin): a resorcin•formalin copolymer of resorcinol: less than 20% and formalin: less than 0.1%

Age resister: "Nonflex OD3" produced by Seiko Chemical Co., Ltd.

Zinc oxide

Vulcanization accelerator TMTD: tetramethylthiuram disulfide

N,N'-m-phenylenedimaleimide: "Palnox PM" produced by Ouchi Shinko Chemical Industrial Co., Ltd.

Stearic acid

Hexamethoxymethylolmelamine

Aramid short fiber: "Conex Short Fiber" produced by Teijin Techno Products Limited, average fiber length: 3 mm, average fiber diameter: 14 μm, a short fiber with a deposit efficiency of 6 mass % in terms of solid content, subjected to an adhesion treatment with RFL solution (resorcin: 2.6 parts, 37% formalin: 1.4 parts, vinylpyridine-styrene-butadiene copolymer latex (produced by ZEON Corp.): 17.2 parts, water: 78.8 parts)

Polyester short fiber: produced by Teijin Techno Products Limited, average short fiber length: 3 mm Sulfur Cord: a twisted cord having a total denier of 6,000 obtained by piling PET fibers of 1,000 denier in a twisting structure of 2×3 at a second twist coefficient of 3.0 and a first twist coefficient of 3.0

[Measurement of Physical Properties of Vulcanized Rubber]

Rubber Hardness

A sheet for each rubber layer sheet was press-vulcanized at a temperature of 160° C. for 30 minutes to manufacture a vulcanized rubber sheet (100 mm×100 mm×2 mm thickness). A laminate obtained by putting three vulcanized rubber sheets on top of one another was used as a sample, and the hardness was measured using Durometer Type A hardness tester in conformity with JIS K6253 (2012).

[Transmission Performance Test]

Figure 4:
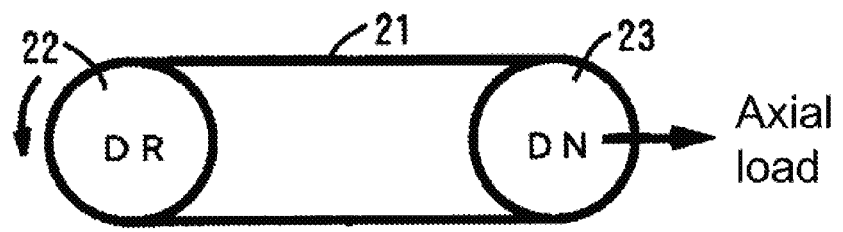
FIG. 4 is a schematic diagram for explaining the transmission performance test method in Examples.

The transmission performance test was performed using a twin-shaft running tester consisting of, as illustrated in FIG. 4, a drive (DR) pulley 22 with a diameter ϕ of 95 mm and a driven (DN) pulley 23 with a diameter ϕ of 95 mm A raw-edge cogged V-belt 21 was hung across respective pulleys 22 and 23, and while rotating the drive pulley 22 at a rotational speed of 4,500 rpm and applying an axial load of 0.2 kN to the driven pulley 23, the raw-edge cogged V-belt 21 was caused to run under a load of 2.5 Nm applied by a loading device (power generator) at an atmosphere temperature of room temperature (about 20° C.).

Then, the transmission efficiency was calculated according to the formula below.

The transmission efficiency is an index indicating that a belt transmits the rotary torque from the drive pulley to the driven pulley, and as the transmission efficiency is higher, the power transmission loss of the belt is smaller, meaning the fuel consumption saving is excellent.

Assuming that $\rho_1$ as the rotational speed of the drive pulley and $r_1$ as the pulley radius, the rotary torque $T_1$ of the drive pulley is represented by $\rho_1 \times Te \times r_1$. Te is an effective tension obtained by subtracting slack side tension (tension of the belt toward the driven pulley) from tight side tension (tension of the belt toward the drive pulley). Similarly, denoting $\rho_2$ as the rotational speed of the driven pulley and $r_2$ as the pulley radius, the rotary torque $T_2$ of the driven pulley is represented by $\rho_2 \times Te \times r_2$. The transmission efficiency $T_2/T_1$ is calculated by dividing the rotary torque $T_2$ of the driven pulley by the rotary torque $T_1$ of the drive pulley and is represented by the following formula.

$$T_2/T_1=(\rho_2 \times Te \times r_2)/(\rho_1 \times Te \times r_1)=(\rho_2 \times r_2)/(\rho_1 \times r_1)$$

The value of transmission efficiency is 1 when no power transmission loss occurs, and when power transmission loss occurs, the value is smaller for the loss portion. More specifically, a value closer to 1 indicates that the power transmission loss is small and the fuel consumption saving is excellent.

In Table 3, taking the transmission efficiency of Comparative Example 1 as "1", the transmission efficiencies of Examples 1 to 5 and Comparative Examples 2 to 4 are shown by a relative value to the transmission efficiency of Comparative Example 1. When the value is more than 0.970, the transmission efficiency was judged to be high (at a practically acceptable level).

[Running Durability Test of Belt]

Figure 5:
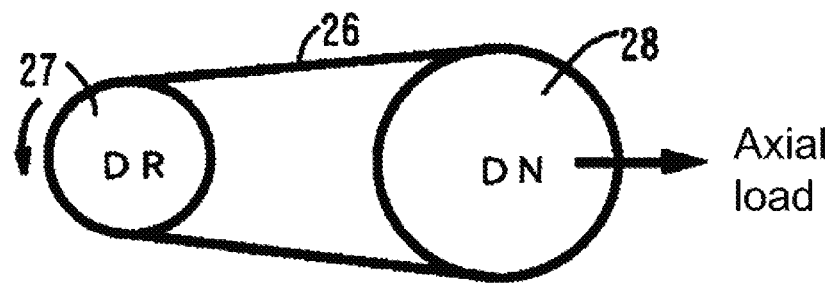
FIG. 5 is a schematic diagram for explaining the running durability test method in Examples.

The running durability test was performed using a twin-shaft running tester consisting of, as illustrated in FIG. 5, a drive (DR) pulley 27 with a diameter ϕ of 50 mm and a driven (DN) pulley 28 with a diameter ϕ of 130 mm A V-belt 26 was hung across respective pulleys 27 and 28, and while rotating the drive pulley 27 at a rotational speed of 6,000 rpm and applying an axial load of 0.4 kN to the driven pulley 28, the V-belt 26 was caused to run for maximally 24 hours under a load of 5.0 Nm applied by a loading device (power generator) at an atmosphere temperature of 80° C. With respect to the drive pulley 27, rotation at a rotational speed of 6,000 rpm for 20 seconds, variable rotation in which the rotation speed is increased or decreased by 20% for 20 seconds, and rotation in which the rotation speed is returned to 6,000 rpm for 20 seconds after the variable rotation, are taken as one rotation cycle, and this cycle was repeated for 60 minutes.

In the running durability test above, the behavior of the belt under running was observed, and the magnitude of vibration of the belt was evaluated with an eye. In addition, the time until generation of a failure portion (defective portion) in the belt was measured, and at the same time, the failure part (defective part) was confirmed. The time until generation of a failure portion (defective portion) in the belt (failure occurrence time (index)) was evaluated by taking the time until generation of a failure portion (defective portion) in the belt of Comparative Example 1 as "100". Here, in the belt of Comparative Example 1, separation between the cord and the first adhesion rubber layer occurred after running for 220 hours.

Examples 1 to 11 and Comparative Examples 1 to 4

(Formation of Rubber Layer)

Each of the rubber compositions in Table 1 (adhesion rubber layer) and Table 2 (compression rubber layer and tension rubber layer) was subjected to rubber kneading using a known method such as Banbury mixer, and the kneaded rubber was allowed to pass through a calender roll to manufacture a rolled unvulcanized rubber sheet (adhesion rubber layer sheet, compression rubber layer sheet, tension rubber layer sheet). In regard to the rubber composition used for the adhesion rubber sheet, the vulcanized rubber physical properties (rubber hardness and thickness) are shown in Table 1.

TABLE 1

(Adhesion Rubber Layer Sheet)

|  | No. 1 | No. 2 | No. 3 | No. 4 | No. 5 |
|---|---|---|---|---|---|
| Chloroprene rubber | 100 | 100 | 100 | 100 | 100 |
| Carbon black | 30 | 35 | 40 | 35 | 40 |
| Silica | 15 | 20 | 20 | 20 | 20 |
| Naphthenic oil | 5 | 5 | 5 | 5 | 5 |
| Magnesium oxide | 4 | 4 | 4 | 4 | 4 |
| Resorcin•formalin copolymerizate | 1 | 1 | 1 | 1 | 1 |
| Age resister | 4 | 4 | 4 | 4 | 4 |
| Zinc oxide | 5 | 5 | 5 | 5 | 5 |
| Vulcanization accelerator TMTD | 1 | 1 | 1 | 1 | 1 |
| N,N'-m-Phenylenedimaleimide | 1 | 2 | 2 | 4 | 4 |
| Stearic acid | 2 | 2 | 2 | 2 | 2 |
| Hexamethoxymethylolmelamine | 3 | 3 | 3 | 3 | 3 |
| Total | 171 | 182 | 187 | 184 | 189 |
| Rubber hardness Hs | 74 | 80 | 82 | 84 | 86 |
| Thickness (mm) | 0.5 | 0.5 | 0.5 | 0.5 | 0.5 |

TABLE 2

(Tension Rubber Layer and Compression Rubber Layer Sheets)

|  | No. 6 | No. 7 | No. 8 | No. 9 |
|---|---|---|---|---|
| Chloroprene rubber | 100 | 100 | 100 | 100 |
| Aramid short fiber | 10 | 20 | 20 | 25 |
| Polyester short fiber | 10 | 0 | 0 | 0 |
| Naphthenic oil | 5 | 5 | 5 | 5 |
| Magnesium oxide | 4 | 4 | 4 | 4 |
| Carbon black | 30 | 40 | 50 | 50 |
| Age resister | 4 | 4 | 4 | 4 |
| Zinc oxide | 5 | 5 | 5 | 5 |
| N,N'-m-Phenylenedimaleimide | 3 | 3 | 3 | 3 |
| Stearic acid | 2 | 2 | 2 | 2 |
| Sulfur | 0.5 | 0.5 | 0.5 | 0.5 |
| Total | 173.5 | 183.5 | 193.5 | 198.5 |
| Rubber hardness Hs | 83 | 89 | 93 | 95 |

Subsequently, the adhesion rubber layer sheet shown in Table 1 and the compression rubber layer and tension rubber layer sheets shown in Table 2 were stacked according to the combination shown in Table 3 to manufacture a power transmission V-belt in which the compression rubber layer and cogs are integrally formed. More specifically, an unvulcanized rubber sheet for compression rubber layer was put into contact with a cogged flat mold having alternating convex portions and concave portions and pressed under heating to prepare a cog pad in a semi-vulcanized state, in which cog portions were formed. A cylindrical mold was covered with an inner matrix having alternating convex portions and concave portions, and the cog pad above was mounted by winding it on the inner matrix to joint at both ends. A first adhesion rubber sheet (unvulcanized rubber sheet) was wound on the cog pad mounted, a cord was spun to form a tension member, and a second adhesion rubber sheet (unvulcanized rubber sheet), a tension rubber layer sheet (unvulcanized rubber sheet) and a reinforcing fabric (top fabric) were sequentially wound thereon to form a molded article. The molded article was then covered with a jacket and vulcanized, and the produced belt sleeve was cut into a V-shape to manufacture a cogged power transmission V-belt. In Comparative Examples, the adhesion rubber layer was formed using two first adhesion rubber sheets (or second adhesion rubber sheets) of the same type.

Figure 6:
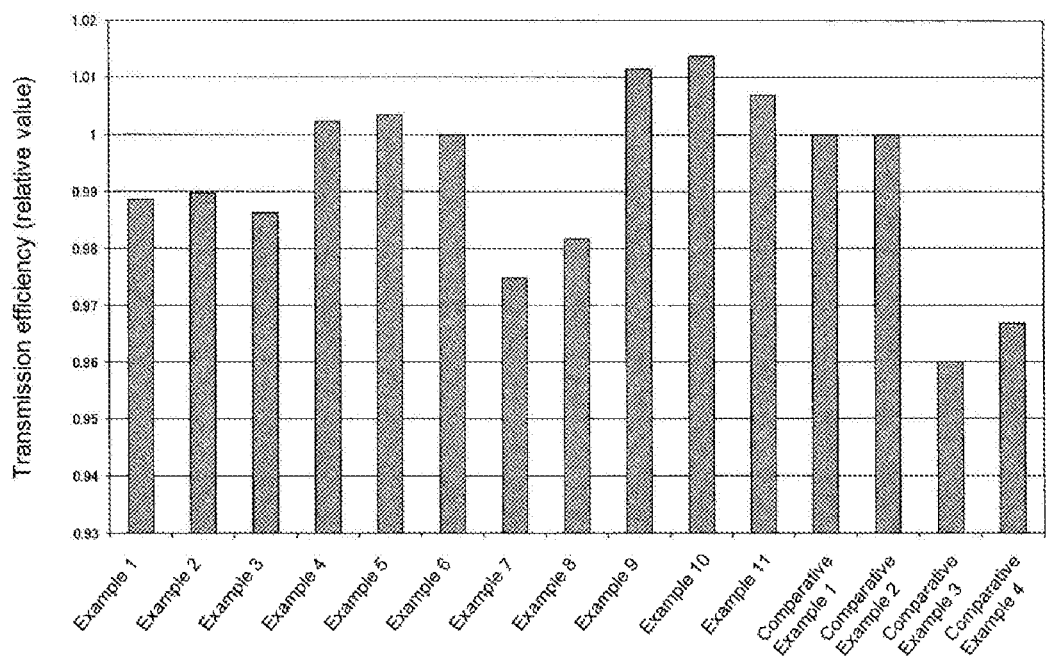
FIG. 6 is a graph illustrating the results of the transmission performance test of the power transmission V-belt in Examples.
Figure 7:
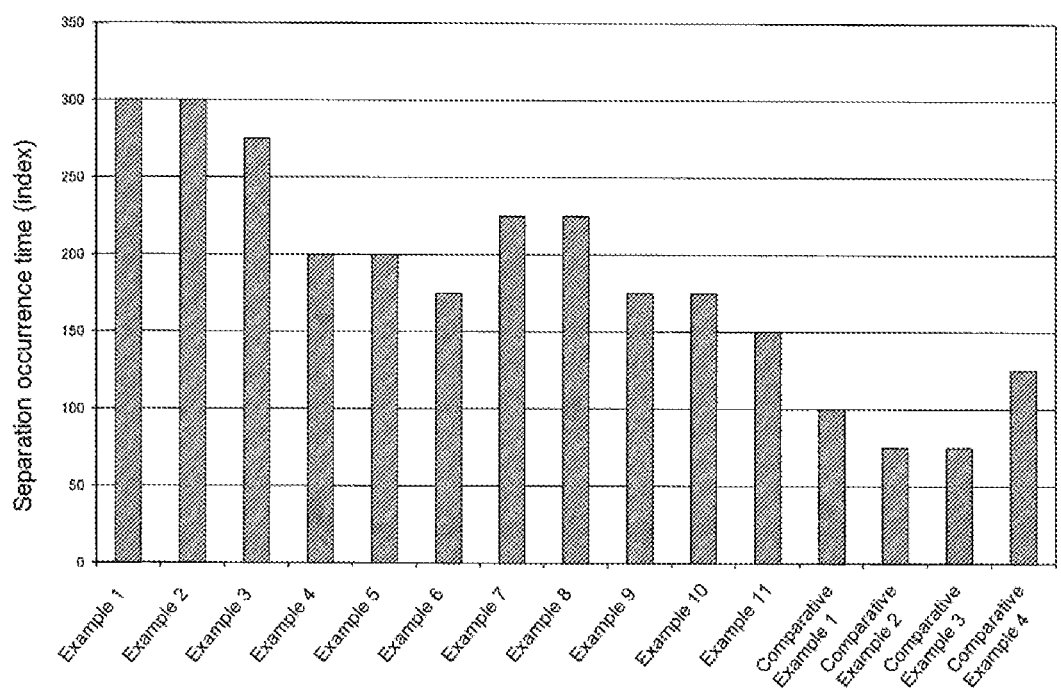
FIG. 7 is a graph illustrating the results of the running durability test of the power transmission V-belt in Examples.

The evaluation results of the obtained power transmission V-belt are shown in Table 3 and FIG. 6 and FIG. 7. Here, the belt thickness in Table 3 means the thickness of the entire belt including cogs (thickness from the surface of the tension rubber layer to the top of the cog crest).

TABLE 3

|  |  | Example | | | | | | | |
|---|---|---|---|---|---|---|---|---|---|
|  |  | 1 | 2 | 3 | 4 | 5 | 6 | 7 | 8 |
| Rubber hardness (JIS A) | Tension rubber layer | 83 | 83 | 83 | 83 | 83 | 83 | 89 | 83 |
|  | First adhesion rubber layer [$H1_2$] | 80 | 74 | 74 | 80 | 74 | 74 | 80 | 74 |
|  | Second adhesion rubber layer [$H1_3$] | 82 | 82 | 84 | 82 | 82 | 84 | 82 | 82 |
|  | Compression rubber layer | 89 | 89 | 89 | 89 | 89 | 89 | 95 | 93 |
| Hardness difference ($H1_3 - H1_2$) | | 2 | 8 | 10 | 2 | 8 | 10 | 2 | 8 |
| Hardness difference (compression rubber layer − tension rubber layer) | | 6 | 6 | 6 | 6 | 6 | 6 | 6 | 10 |
| Thickness of tension rubber layer (mm) | | 1.0 | 1.0 | 1.0 | 1.0 | 1.0 | 1.0 | 1.0 | 1.0 |
| Thickness of compression rubber layer (mm) | | 6.3 | 6.3 | 6.3 | 5.3 | 5.3 | 5.3 | 5.3 | 5.3 |
| Belt thickness (mm) | | 8.5 | 8.5 | 8.5 | 7.5 | 7.5 | 7.5 | 7.5 | 7.5 |
| Transmission efficiency (Comparative Example 1 = 1.00) | | 0.989 | 0.990 | 0.986 | 1.00 | 1.00 | 1.00 | 0.975 | 0.982 |
| Durability test | Belt behavior (vibration) | small | small | small | large | large | large | large | large |
|  | Failure occurrence time (Comparative Example 1 = 100) | 300 | 300 | 275 | 200 | 200 | 175 | 225 | 225 |
|  | Failure part — Between first rubber layer/cord | present | present | present | present | present | present | present | present |
|  | Between cord/second rubber layer | — | — | — | — | — | — | — | — |
|  | Cracking of tension rubber | — | — | — | — | — | — | — | — |

|  |  | Example | | | Comparative Example | | | |
|---|---|---|---|---|---|---|---|---|
|  |  | 9 | 10 | 11 | 1 | 2 | 3 | 4 |
| Rubber hardness (JIS A) | Tension rubber layer | 83 | 83 | 83 | 83 | 83 | 95 | 89 |
|  | First adhesion rubber layer [$H1_2$] | 80 | 74 | 74 | 82 | 80 | 86 | 82 |
|  | Second adhesion rubber layer [$H1_3$] | 82 | 82 | 84 | | | | |
|  | Compression rubber layer | 89 | 89 | 89 | 89 | 89 | 95 | 95 |
| Hardness difference ($H1_3 - H1_2$) | | 2 | 8 | 10 | 0 | 0 | 0 | 0 |
| Hardness difference (compression rubber layer − tension rubber layer) | | 6 | 6 | 6 | 6 | 6 | 0 | 6 |
| Thickness of tension rubber layer (mm) | | 1.0 | 1.0 | 1.0 | 1.0 | 1.0 | 1.0 | 1.0 |
| Thickness of compression rubber layer (mm) | | 4.3 | 4.3 | 4.3 | 5.3 | 5.3 | 5.3 | 5.3 |
| Belt thickness (mm) | | 6.5 | 6.5 | 6.5 | 7.5 | 7.5 | 7.5 | 7.5 |
| Transmission efficiency (Comparative Example 1 = 1.00) | | 1.01 | 1.01 | 1.01 | 1.00 | 1.00 | 0.960 | 0.967 |
| Durability test | Belt behavior (vibration) | large | large | large | large | large | large | large |
|  | Failure occurrence time (Comparative Example 1 = 100) | 175 | 175 | 150 | 100 | 75 | 75 | 125 |
|  | Failure part — Between first rubber layer/cord | present | present | present | present | — | present | present |
|  | Between cord/second rubber layer | — | — | — | — | present | — | — |
|  | Cracking of tension rubber | — | — | — | — | — | present | — |

As apparent from Table 3, in Comparative Example 1 corresponding to a conventional typical power transmission V-belt, the durability is insufficient, and in Comparative Example 2, maybe due to low rubber hardness of the adhesion rubber layer, the durability was reduced and at the same time, separation between the cord and the rubber on the lower side (compression rubber layer side) occurred in the adhesion rubber layer. In Comparative Example 3 corresponding to Patent Document 1, maybe due to high rubber hardness of the adhesion rubber layer, separation between the cord and the rubber on the upper side (tension rubber layer side) occurred in the adhesion rubber layer and not only cracking was generated in the tension rubber layer but also the transmission efficiency could not be improved. In Comparative Example 4 corresponding to Patent Document 2, the tension rubber layer and the compression rubber layer were increased in the hardness and in turn, the failure was improved, but the transmission efficiency could not be sufficiently improved. In this way, in the power transmission V-belt in which the adhesion rubber layer is a single rubber layer, even when the rubber hardness is adjusted, the transmission efficiency cannot be improved while enhancing the durability, and separation between the cord and the adhesion rubber layer and cracking of the tension rubber layer are caused. In particular, when the belt vibration is large, separation between the cord and the rubber on the upper side (tension rubber layer side) occurs early.

On the other hand, in Examples 1 to 11, the distribution of the rubber hardness of the adhesion rubber layer is adjusted (the hardness of the first rubber layer on the upper side (tension rubber layer side) relative to the cord is reduced), and the durability can thereby be greatly enhanced while improving the transmission efficiency even when the belt thickness is small. In particular, the time until occurrence of separation between the cord and the rubber on the upper side (tension rubber layer side) can be delayed by about two times or more while ensuring resistance to separation between the cord and the rubber on the upper side (tension rubber layer side), and the durability can be greatly improved.

While the invention has been described in detail and with reference to specific embodiments thereof, it will be apparent to one skilled in the art that various changes and modifications can be made therein without departing from the spirit and scope of the invention.

This application is based on Japanese Patent Application No. 2016-144298 filed on Jul. 22, 2016 and Japanese Patent Application No. 2017-136697 filed on Jul. 13, 2017, the contents of which are incorporated herein by way of reference.

INDUSTRIAL APPLICABILITY

The power transmission V-belt of the present invention can be applied, for example, to a V-belt (wrapped V-belt, raw-edge V-belt, raw-edge cogged V-belt) and a V-ribbed belt. Among others, the belt is preferably applied to a V-belt (variable speed belt) used in a transmission (continuously variable transmission device) that steplessly changes the gear ratio during belt running, for example, to a raw-edge cogged V-belt and a raw-edge double-cogged V-belt which are used in a continuously variable transmission device of motorcycle, ATV (four-wheeled buggy), snowmobile, etc.

DESCRIPTION OF REFERENCE NUMERALS AND SIGNS

1 Power transmission V-belt
2, 6 Reinforcing fabric
3 Tension rubber layer
4 Adhesion rubber layer
4a Tension member
5 Compression rubber layer

The invention claimed is:

1. A power transmission V-belt comprising:
a tension member,
an adhesion rubber layer in which at least part of the tension member is embedded, and
a tension rubber layer and a compression rubber layer stacked to sandwich the adhesion rubber layer,
wherein a rubber hardness of the tension rubber layer is smaller than a rubber hardness of the compression rubber layer,
wherein the adhesion rubber layer is a two-layer structure of a first adhesion rubber layer and a second adhesion rubber layer, where the first adhesion rubber layer is in contact with the tension rubber layer, and the second adhesion rubber layer is laminated on the first adhesion rubber layer and is in contact with the compression rubber layer, and
wherein a rubber hardness of the first adhesion rubber layer is smaller than a rubber hardness of the second adhesion rubber layer.

2. The power transmission V-belt according to claim 1, having a thickness of from 6.5 to 8.5 mm.

3. The power transmission V-belt according to claim 1, wherein the rubber hardness of the adhesion rubber layer is from 74 to 85° and in the adhesion rubber layer, a difference in rubber hardness between the tension rubber layer side and the compression rubber layer side is from 2 to 12°.

4. The power transmission V-belt according to claim 1, wherein the rubber hardness of the first adhesion rubber layer is from 74 to 82°, the rubber hardness of the second adhesion rubber layer is from 77 to 85°, and a difference in rubber hardness between the first adhesion rubber layer and the second adhesion rubber layer is from 2 to 10°.

5. The power transmission V-belt according to claim 1, wherein the rubber hardness of the tension rubber layer is from 83 to 89°, the rubber hardness of the compression rubber layer is from 89 to 95°, and a difference in rubber hardness between both rubber layers is from 3 to 10°.

6. The power transmission V-belt according to claim 1, having a cog at least on an inner circumferential surface side.

7. The power transmission V-belt according to claim 1, comprising a reinforcing fabric layer stacked on at least one of the tension rubber layer and the compression rubber layer, wherein both side surfaces of each of the tension rubber layer and the compression rubber layer are exposed.

8. The power transmission V-belt according to claim 1, wherein each of the tension rubber layer and the compression rubber layer is formed of a rubber composition containing from 25 to 60 parts by mass of a carbon black, from 15 to 30 parts by mass of a short fiber, from 1 to 20 parts by mass of a metal oxide vulcanizing agent, and from 2 to 5 parts by mass of a bismaleimide, per 100 parts by mass of a chloroprene rubber; and at least one component selected from the carbon black, the bismaleimide and the short fiber which is contained in a larger proportion in the compression rubber layer than in the tension rubber layer.

9. The power transmission V-belt according to claim 1, wherein the adhesion rubber layer is formed of a rubber composition containing from 25 to 50 parts by mass of a carbon black, from 10 to 30 parts by mass of a silica, from 1 to 20 parts by mass of a metal oxide vulcanizing agent, and from 0.5 to 5 parts by mass of a bismaleimide, per 100 parts by mass of a chloroprene rubber; and at least one component selected from the carbon black, the silica and the bismaleimide which is contained in a smaller proportion in the tension rubber layer side than in the compression rubber layer side.

10. The power transmission V-belt according to claim 1, which is a variable speed belt.

11. The power transmission V-belt according to claim 1, wherein the tension member is interposed between the first adhesion rubber layer and the second adhesion rubber layer.

12. The power transmission V-belt according to claim 1, wherein the tension member is interposed between the first adhesion rubber layer and the second adhesion rubber layer while contacting the first adhesion rubber layer and the second adhesion rubber layer.

13. The power transmission V-belt according to claim 1, wherein the rubber hardness of the first adhesion rubber layer is smaller than the rubber hardness of the tension rubber layer, and the rubber hardness of the second adhesion rubber layer is smaller than the rubber hardness of the compression rubber layer.

\* \* \* \* \*